United States Patent

Breedvelt-Schouten et al.

(10) Patent No.: US 10,282,905 B2
(45) Date of Patent: *May 7, 2019

(54) ASSISTIVE OVERLAY FOR REPORT GENERATION

(71) Applicant: International Business Machines Corporation, Armonk, NY (US)

(72) Inventors: Ilse M. Breedvelt-Schouten, Manotick (CA); Blair E. P. Moxon, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/193,602

(22) Filed: Feb. 28, 2014

(65) Prior Publication Data

US 2015/0248212 A1 Sep. 3, 2015

(51) Int. Cl.
*G06F 17/30* (2006.01)
*G06T 19/00* (2011.01)
(Continued)

(52) U.S. Cl.
CPC .......... *G06T 19/006* (2013.01); *G06F 3/0486* (2013.01); *G06F 3/0488* (2013.01);
(Continued)

(58) Field of Classification Search
CPC ...... G06F 3/0482; G06F 3/04842; G06F 8/34; G06Q 10/10; G06T 11/00; G06T 19/006; G06T 2219/008
(Continued)

(56) References Cited

U.S. PATENT DOCUMENTS 5,742,286 A * 4/1998 Kung .................... G06F 3/0486
715/733
5,754,179 A 5/1998 Hocker et al.
(Continued)

FOREIGN PATENT DOCUMENTS

CN 101339568 A 1/2009
CN 102841938 A 12/2012

OTHER PUBLICATIONS

Physical, Set, Virtual definitions; 2011, The American Heritage Dictionary of the English language, Houghton Mifflin, Retrieved from http://search.credoreference.com/content/entry/hmdictenglang/ physical/0, /virtual/0, and /set_2/0 on Jan. 2, 2016; 8 pgs.*
(Continued)

*Primary Examiner* — Doon Y Chow
*Assistant Examiner* — Wendy Nicholas
(74) *Attorney, Agent, or Firm* — Shumaker & Sieffert, P.A.

(57) ABSTRACT

A computing device includes at least one processor and at least one module operable by the at least one processor to output, for display, a graphical user interface (GUI) comprising one or more graphical objects representing one or more data elements, receive input to select a graphical object representing a data element, wherein the selection occurs at a start location within the GUI, and determine a set of spatial locations with which the data element can be associated. The at least one module is further operable to output, for display, a plurality of overlay elements, each comprising a respective boundary that forms a respective path from the start location to a respective graphical representation of a respective spatial location, receive input to traverse a chosen overlay element, and associate the data element with the respective spatial location corresponding to the chosen overlay element.

18 Claims, 8 Drawing Sheets

(51) Int. Cl.
*G06F 3/0484* (2013.01)
*G06T 11/00* (2006.01)
*G06Q 10/10* (2012.01)
*G06F 3/0488* (2013.01)
*G06F 3/0486* (2013.01)

(52) U.S. Cl.
CPC .... *G06F 3/04842* (2013.01); *G06F 17/30572* (2013.01); *G06Q 10/10* (2013.01); *G06T 11/00* (2013.01)

(58) Field of Classification Search
USPC .......................................................... 715/850
See application file for complete search history.

(56) References Cited

U.S. PATENT DOCUMENTS

| | | | |
|---|---|---|---|
| 5,920,313 | A | 7/1999 | Diedrichsen et al. |
| 5,999,178 | A | 12/1999 | Hwang et al. |
| 6,144,962 | A | 11/2000 | Weinberg et al. |
| 6,362,842 | B1 | 3/2002 | Tahara et al. |
| 7,324,983 | B1 | 1/2008 | Morris et al. |
| 7,752,566 | B1 | 7/2010 | Nelson |
| 7,770,125 | B1* | 8/2010 | Young .................. G06F 9/451 715/764 |
| 7,925,658 | B2 | 4/2011 | Colaco et al. |
| 7,958,460 | B2 | 6/2011 | Garrison |
| 8,788,975 | B1* | 7/2014 | Griddaluru ....... G06F 17/30241 715/851 |
| 8,972,898 | B2* | 3/2015 | Carter ........................ 715/757 |
| 2002/0013788 | A1 | 1/2002 | Pennell et al. |
| 2004/0095390 | A1 | 5/2004 | Andrews et al. |
| 2006/0070007 | A1 | 3/2006 | Cummins et al. |
| 2006/0136833 | A1 | 6/2006 | Dettinger et al. |
| 2008/0077874 | A1* | 3/2008 | Garbow .............. G06F 3/0486 715/764 |
| 2008/0172636 | A1 | 7/2008 | Danas |
| 2008/0215621 | A1 | 9/2008 | Ravindran et al. |
| 2008/0307357 | A1 | 12/2008 | Gould et al. |
| 2009/0113330 | A1* | 4/2009 | Garrison .............. G06F 3/0486 715/769 |
| 2009/0125129 | A1 | 5/2009 | Eldridge et al. |
| 2009/0187842 | A1* | 7/2009 | Collins ................ G06F 3/0486 715/769 |
| 2009/0276701 | A1 | 11/2009 | Nurmi |
| 2010/0050076 | A1* | 2/2010 | Roth ................... G06F 3/04883 715/702 |
| 2010/0153870 | A1* | 6/2010 | Hoffmann .............. G06Q 10/06 715/767 |
| 2011/0099497 | A1 | 4/2011 | Fok et al. |
| 2011/0202469 | A1* | 8/2011 | Venkateswaran ..... G06F 3/0486 705/301 |
| 2011/0270833 | A1* | 11/2011 | von Kaenel ...... G06F 17/30241 707/736 |
| 2011/0307817 | A1 | 12/2011 | Doucer et al. |
| 2012/0005058 | A1* | 1/2012 | Buck ...................... G06Q 40/04 705/37 |
| 2012/0030566 | A1 | 2/2012 | Victor |
| 2012/0072871 | A1 | 3/2012 | Seo et al. |
| 2012/0144325 | A1* | 6/2012 | Mital .................... G06F 9/4446 715/763 |
| 2012/0162265 | A1* | 6/2012 | Heinrich .......... G06Q 10/06393 345/661 |
| 2012/0174041 | A1 | 7/2012 | Queru |
| 2012/0256863 | A1 | 10/2012 | Zhang et al. |
| 2012/0297327 | A1* | 11/2012 | Chow ................. G09B 29/007 715/765 |
| 2012/0299933 | A1 | 11/2012 | Lau et al. |
| 2012/0324378 | A1* | 12/2012 | Stambaugh ......... G06F 3/04817 715/764 |
| 2013/0019200 | A1 | 1/2013 | Montague |
| 2013/0024795 | A1 | 1/2013 | Robatham et al. |
| 2013/0042207 | A1 | 2/2013 | Matthews et al. |
| 2013/0317745 | A1* | 11/2013 | Sano .................... G09B 29/007 701/533 |
| 2014/0040834 | A1* | 2/2014 | Thompson ............ G06F 3/0481 715/856 |
| 2014/0047351 | A1* | 2/2014 | Cui ......................... G06Q 10/06 715/744 |
| 2014/0215405 | A1* | 7/2014 | Breedvelt-Schouten ............... G06F 3/0482 715/841 |
| 2014/0248948 | A1 | 9/2014 | Ho et al. |
| 2014/0282254 | A1 | 9/2014 | Feiereisen et al. |
| 2015/0026642 | A1 | 1/2015 | Wilson et al. |
| 2015/0073954 | A1* | 3/2015 | Braff ..................... G06Q 30/00 705/30 |

OTHER PUBLICATIONS

Accot, J., & Zhai, S. (Apr. 2002). More than dotting the i's—foundations for crossing-based interfaces. In Proceedings of the SIGCHI conference on Human factors in computing systems (pp. 73-80). ACM.*
Yang Li, "Gesture-Based Interaction: A New Dimension for Mobile User Interfaces," AVI'12, Capri Island, Italy, Retrieved from Internet: http://yangl.org/pdf/avi-2012-keynote.pdf (Abstract), May 21-25, 2012, 1 pp.
Report Studio Professional Authoring User Guide 8.4.0, Retrieved from Internet: http://publib.boulder.ibm.com/infocenter/c8bi/v8r4m0/index.jsp?topic=/com.ibm.swg.im.cognos.ug_rptstd_fin.8.4.0.doc/ug_rptstd_fin.html, Nov. 27, 2009, 1 pp.
Shivde et al. "IBM Congos Proven Practices: Auto Cascading Prompts without Page Refresh in IBM Cognos Report Studio," IBM Corporation, Aug. 22, 2011, 11 pp.
U.S. Appl. No. 13/752,172, by Ilse M. Breedvelt-Schouten, filed Jan. 28, 2013.
Leonard, "An Exploratory Investigation of Handheld Computer Interaction for Older Adults with Visual Impairments," ASSETS '05 ACM, Oct. 2005, pp. 12-19.
Beaudouin-Lafon, "Designing Interaction, not Interfaces," AVI'04, May 25, 2004; pp. 15-22.
Pausch, et al., "Lessons Learned from Suit, the Simple User Interface Toolkit," Computer Science Department, University of Virginia, Charlottesville, VA, ACM Transactions on Infromation System, vol. 10, No. 4, Oct. 1992, pp. 320-344.
Hudson, et al., "Extensible input Handling in the subArtic Toolkit," CHI 2005, Apr. 2, 2005, Portland, Oregon, pp. 381-390.
"Microsoft Windows User Experience," Oct. 8, 1999, Microsoft Press, Chapter 5, pp. 108.
Roth et al., "Bezel Swipe: Conflict-Free Scrolling and Multiple Selection on Mobile Touch Screen Devices," Apr. 4, 2009, ACM, In CHI 2009, Boston, MA.
Adobe Systems, Inc., Photoshop Help/ Selecting with the lasso tools, copyright 2015, updated Mar. 18, 2015, https://helpx.adobe.com/photoshop/using/selecting-lasso-tools.html.
Adobe Systems, Inc., Illustrator Help / Selecting objects, updated Oct. 20, 2014, https://helpx.adobe.com/illustrator/using/selecting-objects.html.
Office Action from U.S. Appl. No. 14/226,757, dated Sep. 23, 2015, 39 pp.
Notice of Allowance from U.S. Appl. No. 13/752,172, dated Oct. 7, 2015, 2015, 17 pp.
Office Action from U.S. Appl. No. 13/752,172, dated Jan. 7, 2015, 40 pp.
Amendment in Response to Office Action dated Sep. 23, 2015, from U.S. Appl. No. 14/226,757, filed Dec. 28, 2015, 11 pp.
Final Office Action from U.S. Appl. No. 14/226,757, dated Apr. 25, 2016 41 pgs.
Notice of Allowance from U.S. Appl. No. 13/752,172, dated May 6, 2016 9 pgs.
Advisory Action from U.S. Appl. No. 14/226,757, dated Aug. 3, 2016, 3 pp.
Notice of Allowance from U.S. Appl. No. 14/226,757, dated Dec. 2, 2016 9 pgs.

(56) References Cited

OTHER PUBLICATIONS

Response to Office Action dated Apr. 20, 2017, from U.S. Appl. No. 14/645,334, filed Jul. 20, 2017, 15 pp.
Office Action from U.S. Appl. No. 14/645,334, dated Apr. 20, 2017, 48 pp.
"Moving, Aligning, and Distributing Objects," Illustrator Help, Jun. 30, 2014, 4 pp.
"Editing Images," PowerPoint 2007, Feb. 13, 2014, 7 pp.
"Join and Trim Paths," Adobe Illustrator CC, Dec. 30, 2014, 7 pp.
Final Office Action from U.S. Appl. No. 14/645,334, dated Nov. 3, 2017, 45 pp.
Amendment in Response to Office Action dated Nov. 3, 2017, from U.S. Appl. No. 14/645,334, filed Feb. 2, 2018, 12 pp.
Advisory Action from U.S. Appl. No. 14/645,334, dated Jan. 17, 2018, 4 pp.
Amendment in Response to Office Action dated Mar. 13, 2018, from U.S. Appl. No. 14/645,334, filed Jul. 13, 2018, 11 pp.
Final Office Action from U.S. Appl. No. 14/645,334, dated Jul. 26, 2018, 48 pp.
Office Action from U.S. Appl. No. 14/645,334, dated Mar. 13, 2018, 45 pp.
Advisory Action from U.S. Appl. No. 14/645,334, dated Oct. 10, 2018, 3 pp.
Office Action from U.S. Appl. No. 14/645,334, dated Dec. 5, 2018, 52 pp.
Response to the Final Office Action dated Apr. 25, 2016, from U.S. Appl. No. 14/226,757, filed Jul. 25, 2016, 10 pp.
Office Action from U.S. Appl. No. 13/752,172, dated Mar. 4, 2015, 40 pp.
Notice of Allowance from U.S. Appl. No. 13/752,172, dated Jan. 12, 2016, 9 pp.

\* cited by examiner

ASSISTIVE OVERLAY FOR REPORT GENERATION

FIELD OF INVENTION

The disclosure relates to a user interface (UI) of computing devices and, more specifically, to selection of spatial options within a UI.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications acquire data entered from a large base of users that the software then accumulates into higher-level areas of responsibility in the organization. Often these systems make use of multidimensional data sources that organize and manipulate the large volume of data using data structures referred to as data cubes. A data cube may, for example, include a plurality of hierarchical dimensions having levels and members for storing the multidimensional data. Once data has been entered, a user may wish to view some or all of the data in a coherent manner by generating a report. The system may perform mathematical calculations on the data and combine data submitted by many users. Using the results of these calculations, the system may generate reports for review.

The use of reporting and analysis end-user products (typically referred to as Business Intelligence, or BI, tools) allows users to author reports and perform data exploration and analysis on a myriad of data sources, such as multidimensional data structures, relational databases, flat files, Extensible Markup Language ("XML") data, data streams, and unorganized text and data. Business intelligence tools may be used to prepare and aggregate individual reports and analyses by executing queries on underlying data sources and to present those reports and analyses in a user-accessible format.

SUMMARY

In one example, a method includes outputting, by a computing device and for display, a graphical user interface (GUI) comprising one or more graphical objects representing one or more data elements from a data source, receiving, by the computing device, a first indication of input to select a graphical object from the one or more graphical objects, the graphical object representing a data element from the one or more data elements, wherein the selection occurs at a start location within the GUI, and, responsive to receiving the first indication of input, determining, by the computing device and based at least in part on the data element, a set of spatial locations with which the data element can be associated, wherein each of the spatial locations comprises a location within a three-dimensional (3D) physical environment. The method further includes outputting, by the computing device and for display, a plurality of overlay elements as part of the GUI, each of the plurality of overlay elements comprising a respective boundary that forms a respective path from the start location to a respective graphical representation of a respective spatial location from the set of spatial locations, receiving, by the computing device, a second indication of input to traverse a chosen overlay element from the plurality of overlay elements, the traversal being from the start location and to a second location within the respective path of the chosen overlay element from the plurality of overlay elements, and, responsive to receiving the second indication, associating, by the computing device, the data element with the respective spatial location corresponding to the chosen overlay element from the plurality of overlay elements.

In another example, a computing device includes at least one processor; and at least one module operable by the at least one processor to output, for display, a graphical user interface (GUI) comprising one or more graphical objects representing one or more data elements from a data source, receive a first indication of input to select a graphical object from the one or more graphical objects, the graphical object representing a data element from the one or more data elements, wherein the selection occurs at a start location within the GUI, and, responsive to receiving the first indication of input, determine, based at least in part on the data element, a set of spatial locations with which the data element can be associated, wherein each of the spatial locations comprises a location within a three-dimensional (3D) physical environment. The at least one module is further operable by the at least one processor to output, for display, a plurality of overlay elements as part of the GUI, each of the plurality of overlay elements comprising a respective boundary that forms a respective path from the start location to a respective graphical representation of a respective spatial location from the set of spatial locations, receive a second indication of input to traverse a chosen overlay element from the plurality of overlay elements, the traversal being from the start location and to a second location within the respective path of the chosen overlay element from the plurality of overlay elements, and, responsive to receiving the second indication, associate the data element with the respective spatial location corresponding to the chosen overlay element from the plurality of overlay elements.

In another example, a computer program product includes a computer readable storage medium having program code embodied therewith, the program code executable by at least one processor of a computing device to output, for display, a graphical user interface (GUI) comprising one or more graphical objects representing one or more data elements from a data source, receive a first indication of input to select a graphical object from the one or more graphical objects, the graphical object representing a data element from the one or more data elements, wherein the selection occurs at a start location within the GUI, and, responsive to receiving the first indication of input, determine, based at least in part on the data element, a set of spatial locations with which the data element can be associated, wherein each of the spatial locations comprises a location within a three-dimensional (3D) physical environment. The program code is further executable by the at least one processor to output, for display, a plurality of overlay elements as part of the GUI, each of the plurality of overlay elements comprising a respective boundary that forms a respective path from the start location to a respective graphical representation of a respective spatial location from the set of spatial locations, receive a second indication of input to traverse a chosen overlay element from the plurality of overlay elements, the traversal being from the start location and to a second location within the respective path of the chosen overlay element from the plurality of overlay elements, and, responsive to receiving the second indication, associate the data element with the respective spatial location corresponding to the chosen overlay element from the plurality of overlay elements.

The details of one or more aspects of this disclosure are set forth in the accompanying drawings and the description below. Other features will be apparent from the description and drawings, and from the claims.

DETAILED DESCRIPTION

In many business applications users may make multiple decisions about what categories objects or items belong to, either for themselves or for others. In the most basic sense, assigning objects to categories may be accomplished by selecting a single category for each given item. However, when selecting the right category involves different nested selection criteria and/or hidden dependencies, selection may become difficult and/or tedious. Additionally, as the type of selection changes (e.g., from a symbolic selection to a physical or spatial selection), users may become confused and annoyed.

Techniques of the present disclosure enable a computing device to provide a user with guided, cascading or nested selection options when the user is making various choices from among different categorical and/or spatial options. That is, in accordance with the techniques described herein, the computing device may allow the user to drag a visual representation of an object through a series of guided or restricted paths to make a series of choices in order to categorize the object. By combining both textual and spatial selection into a string of choices the user may drag an object through, the techniques described herein may reduce or obviate the need for dropdown menus, lists, and/or other methods for navigating multiple decisions.

Figure 1:
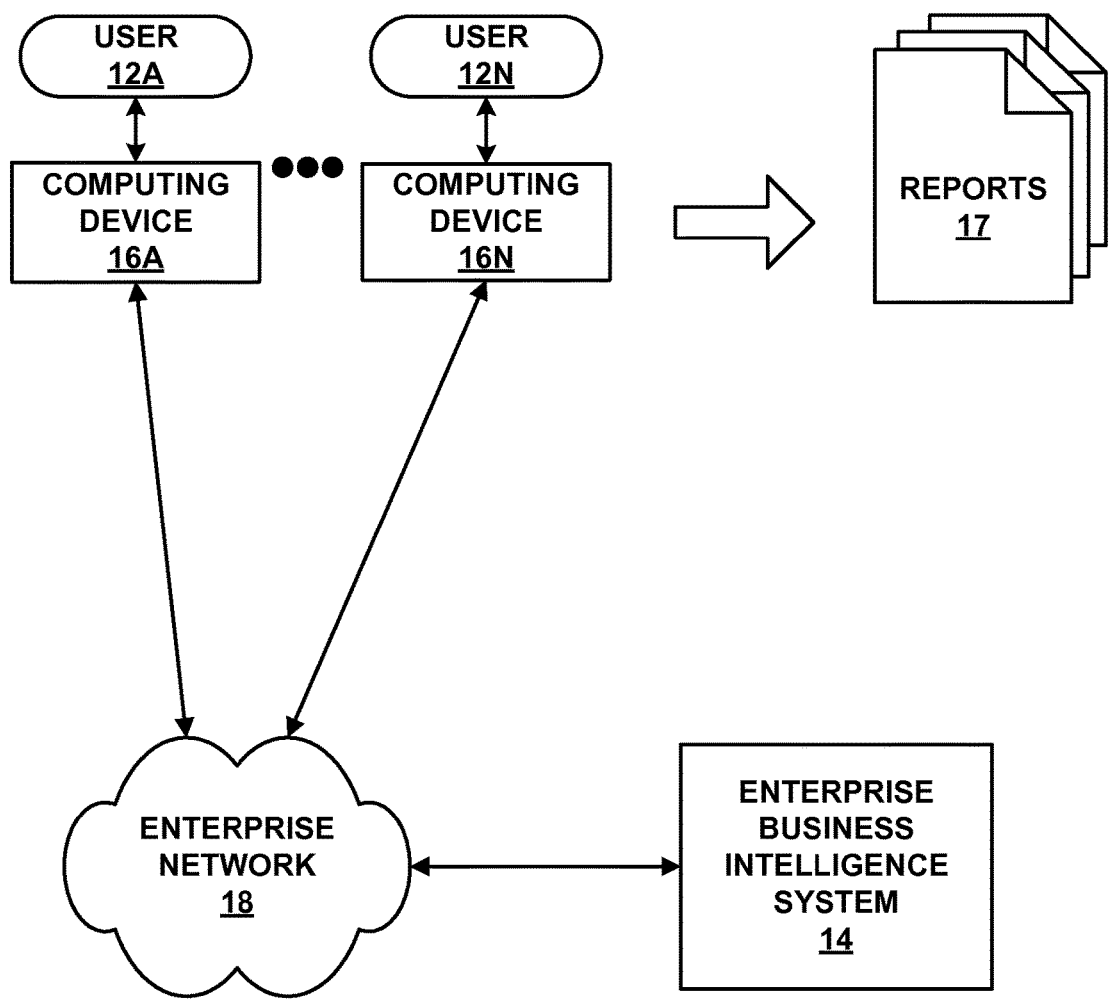
FIG. 1 is a block diagram illustrating an example computing environment in which a plurality of users interact with an enterprise business intelligence system, in accordance with one or more aspects of the present disclosure.

FIG. 1 is a block diagram illustrating an example computing environment (e.g., enterprise 4) in which a plurality of users 12A-12N (collectively "users 12") may interact with an enterprise business intelligence system 14, in accordance with one or more aspects of the present disclosure. As shown in the example system of FIG. 1, enterprise business intelligence system 14 may be communicatively coupled to a number of computing devices 16A-16N (collectively "computing devices 16") via enterprise network 18. Users 12 interact with their respective computing devices to access enterprise business intelligence system 14 in order to input, modify, and review data. In one example, users 12 may use computing devices 16 to access enterprise business intelligence system 14 and author one or more reports 17. Reports 17 may include business intelligence reports, such as sales reports, revenue reports, payroll reports, and the like. Enterprise business intelligence system 14 may provide users 12 with functionality to create or define a structure for reports 17 using report specifications. Computing devices 16A-16N, enterprise network 18, and enterprise business intelligence system 14 may all be either in a single facility or widely dispersed in two or more separate locations anywhere in the world, in different examples.

For purposes of illustration only, various techniques of the present disclosure are described with respect to generation of reports and/or report specifications. However, certain examples of the techniques of this disclosure may be readily applied to various software systems executed by various devices, including enterprise business intelligence systems, other large-scale enterprise software systems, as well as single-user and/or stand-alone software applications. Examples of enterprise software systems include enterprise human resources systems, financial or budget planning systems, order management systems, inventory management systems, sales force management systems, business intelligence tools, enterprise reporting tools, project and resource management systems, and other enterprise software systems. Other example applications include graphical design applications, email applications, classroom management software, or any environment where fine-grained user interaction and/or selection among a plurality of spatial options may be beneficial. For instance, various techniques of this disclosure may be readily applied by computing devices for associating attributes or objects with spatial locations, such as locations within a three-dimensional (3D) physical environment (e.g., the "real world"). That is, assisted spatial selection using graphical overlays may allow a user to more easily place or design aspects of an object when performing various tasks, such as organizing a workforce.

In the example of FIG. 1, users 12 may interact with a user-configurable business intelligence user interface (UI) to view and manipulate data (e.g., generate reports 17, update data, and the like) via their respective computing devices 16. This may include data from any of a wide variety of sources, including from multidimensional data structures and relational databases within enterprise 4, as well as data from a variety of external sources that may be accessible over a public network. Multidimensional data structures are "multidimensional" in that each multidimensional data element is defined by a plurality of different object types, where each object is associated with a different dimension. Users 12 may, for example, retrieve data related to store sales by entering a name of a sales person, a store identifier, a date, a product, and a price at which the product was sold, into their respective computing devices 16.

Enterprise users 12 may use a variety of different types of computing devices 16 to execute a business intelligence UI in order to generate business intelligence reports 17, manage business entities or otherwise interact with enterprise business intelligence system 14 via enterprise network 18. For example, an enterprise user 12 may utilize a business intelligence UI to interact with enterprise business intelligence system 14 using a laptop computer, desktop computer, or the like, which implements a web browser. Alternatively, an enterprise user 12 may use a smartphone or similar device, executing a business intelligence UI in either a web browser or a dedicated mobile application for interacting with enterprise business intelligence system 14. Further examples of computing devices 16 may include workstation computers, netbooks, tablet computers, E-readers, or any other computing device. In either case, a business intelligence UI running on a user's computing device 16 may access various data sources from within enterprise business intelligence system 14, as well as any of a variety of external network resources and any of a variety of external data sources.

Enterprise network 18 may represent any communication network, such as a packet-based digital network like a private enterprise intranet or a public network like the Internet. In this manner, enterprise network 18 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

In some examples, the business intelligence UI running on a user's computing device 16 may use retrieved data to generate one or more reports 17. Reports 17 may include any visual representation or depiction of data such as tables, charts, graphs, or other methods of disseminating information. For example, reports 17 may include a graph with sales values assigned to a vertical axis, and time values assigned to a horizontal axis, a chart of revenue values recorded for various sales regions, a table of payroll data values recorded for different enterprise locations, a graph of enterprise spending by department, and the like. Users 12 may interact with computing devices 16 to generate reports 17 by selecting different elements and/or dimensions to display in reports 17.

Various data elements or dimensions of enterprise data may be organized in a hierarchy, divisible into sub-elements or having other selectable attributes. Examples of hierarchical data elements include sales zones of the world, business regions and locations within an enterprise, etc. Examples of sub-elements may include more specific areas or locations, separation into various value ranges, static or dynamic reporting, etc. In some examples, these sub-elements or other selectable attributes may optionally be defined in report specifications by report options. Generally, report options may determine the type, layout, quantity, categories, or other characteristics of data elements for reports 17. Report options may also define the particular data elements or range of data elements to include in reports 17. In other examples, report options may include any modifiable characteristic of a selectable data element or dimension. Users 12 may cause computing devices 16 to create report specifications having one or more definitions based on local data stored on computing devices 16 and/or data obtained via enterprise network 18. Report specifications may be used in generating reports 17.

Techniques of the present disclosure may improve user efficiency in report generation and other areas in which a user may need to select from among a plurality of spatial options (e.g., graphical design, supply chain management, and others) by providing a UI having a plurality of overlay elements to assist in assigning a spatial attribute (e.g., representing a location within a 3D environment such as the real world) to various objects or data elements (e.g., to create definitions for report specifications). For example, the UI may provide overlay elements to select a geographical area with which to associate a data element in order to create a report option. The overlay elements may each include a path, traversable by the user, to associate an object or data element with a respective spatial location. By providing overlay elements with traversable paths, the computing device may allow a user to associate data elements with various attributes or definitions using simple, intuitive motions. Furthermore, the computing device may cascade spatial selection by providing a new set of overlay elements when an initial selection is made by the user. That is, computing device 16A may reduce the amount of input (e.g., clicks and/or motion) required to choose a report option and/or create a definition for a report specification by providing an assistive spatial selection UI to the user.

Figure 2:
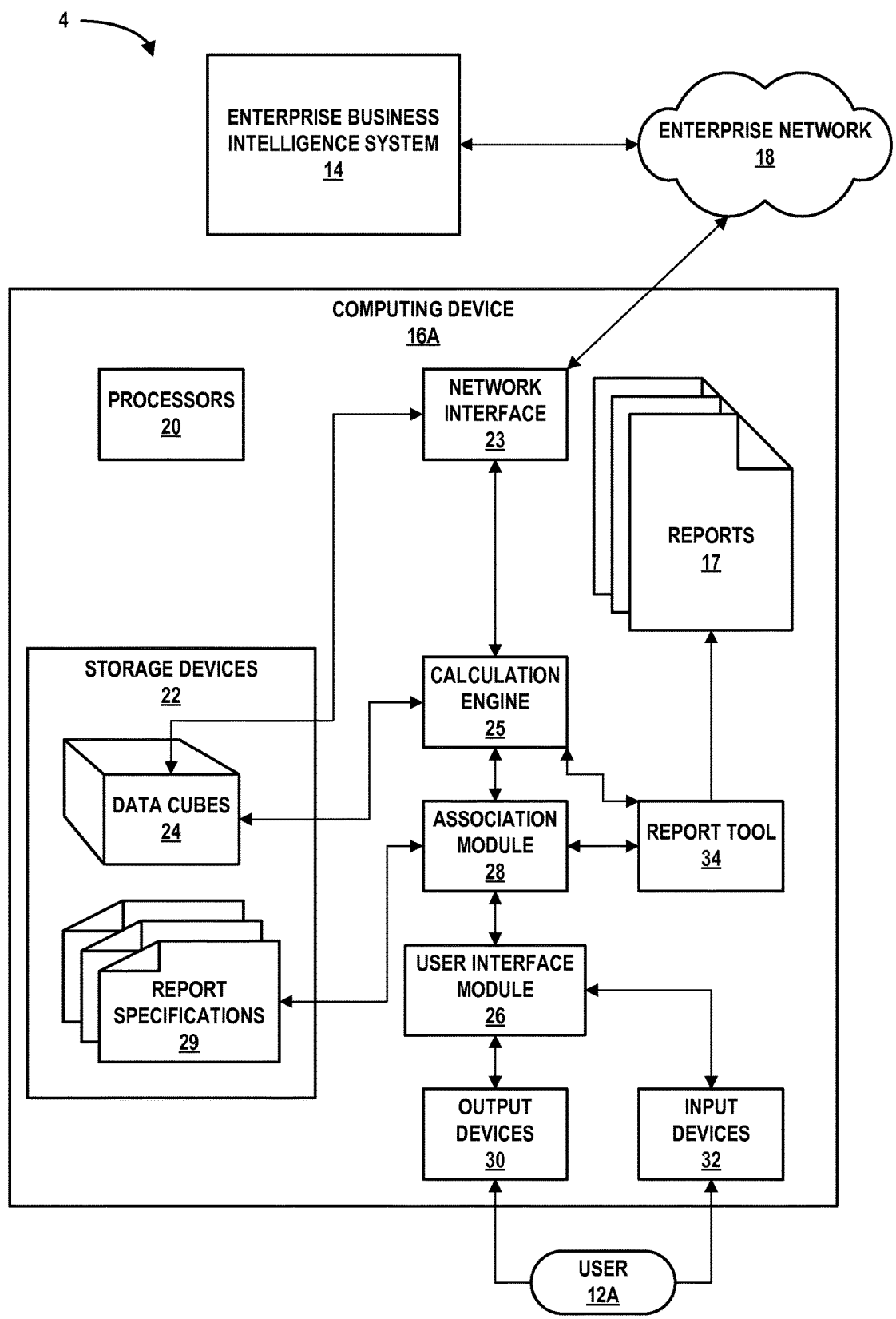
FIG. 2 is a block diagram illustrating one example of a computing device that may interact with the enterprise business intelligence system of FIG. 1, in accordance with one or more aspects of the present disclosure.

FIG. 2 is a block diagram illustrating one example of a computing device 16A for interacting with the enterprise business intelligence system 14 of FIG. 1, in accordance with one or more aspects of the present disclosure. The example of FIG. 2 is described within the context of generating one or more of reports 17. In other examples, one or more techniques of the present disclosure may be applied to various other situations in order to provide assisted spatial selection to a user. As shown in the example of FIG. 2, computing device 16A includes one or more processors 20, and one or more storage devices 22. Computing device 16A also includes network interface 23, calculation engine 25, user interface (UI) module 26, association module 28, one or more output devices 30, one or more input devices 32 and report tool 34. Storage devices 22 may contain data cubes 24 and report specifications 29, as shown in FIG. 2. In other examples, storage devices 22 may contain other components of computing device 16A.

Processors 20, in the example of FIG. 2, may be configured to implement functionality and/or process instructions for execution within computing device 16A. For example, processors 20 may be capable of executing instructions of various components of computing device 16A, such as calculation engine 25. Examples of processors 20 may include, any one or more of a microprocessor, a controller, a digital signal processor (DSP), an application specific integrated circuit (ASIC), a field-programmable gate array (FPGA), or equivalent discrete or integrated logic circuitry.

In the example of FIG. 2, one or more of storage devices 22 may be configured to store information within computing device 16A during operation. Storage devices 22, in some examples, are a temporary memory, meaning that a primary purpose of storage devices 22 is not long-term storage. Storage devices 22, in some examples, are described as volatile memory, meaning that storage devices 22 do not maintain stored contents when the computer is turned off. Examples of volatile memories include random access memories (RAM), dynamic random access memories (DRAM), static random access memories (SRAM), and other forms of volatile memories known in the art. In some examples, storage devices are used to store program instructions for execution by processors 20. Storage devices 22, in one example, are used by software or applications running on computing device 16A (e.g., calculation engine 25, modules 26 and 28, or report tool 34) to temporarily store information during program execution.

Storage devices 22, in the example of FIG. 2, may include one or more computer-readable storage media. Storage devices 22 may be configured to store larger amounts of information than volatile memory. Storage devices 22 may further be configured for long-term storage of information. In some examples, storage devices 22 include non-volatile storage elements. Examples of such non-volatile storage elements include magnetic hard discs, optical discs, floppy discs, flash memories, or forms of electrically programmable memories (EPROM) or electrically erasable and programmable memories (EEPROM). As one example, storage devices 22 may store data cubes 24 and report specifications 29 for use during operation of computing device 16A.

In the example of FIG. 2, computing device 16A includes network interface 23. Network interface 23 may provide functionality to communicate with external devices, such as enterprise business intelligence system 14, via one or more networks (e.g., enterprise network 18). Examples of network interface 23 may include a network interface card, such as an Ethernet card, an optical transceiver, a radio frequency transceiver, or any other type of device that can send and receive information. Other examples of network interfaces may include 3G and WiFi radio components, as well as Universal Serial Bus (USB). In some examples, computing device 16A may utilize network interface 23 to communicate with enterprise business intelligence system 14 when sending or receiving multidimensional data, such as when retrieving data for reports 17.

Computing device 16A, in the example of FIG. 2, may include one or more data cubes 24 within storage devices 22. Data cubes 24 may store data from user 12A and/or from data sources of enterprise business intelligence system 14 via enterprise network 18. Data stored in data cubes 24 may provide the underlying data for computing device 16A to operate on, such as when assigning attributes to data elements or objects, defining report specifications 29, and/or create reports 17.

In some examples, data cubes 24 may include two-dimensional databases and/or multidimensional databases. Data cubes 24 may be implemented using a variety of vendor platforms, and may be distributed throughout the enterprise via network interface 23. As one example, data cubes 24 may be multidimensional databases configured for Online Analytical Processing (OLAP). As another example, data cubes 24 may be located within multidimensional databases configured to receive and execute Multidimensional Expression (MDX) queries of some arbitrary level of complexity. As yet another example, data cubes 24 may be two-dimensional relational databases configured to receive and execute SQL queries, also with an arbitrary level of complexity. Storing data cubes 24 locally within storage devices 22 may allow some or all calculation required in defining report specifications 29 and generating reports 17 to be performed locally by computing device 16A. In other examples, computing device 16A may not store data cubes 24 locally, and one or more devices, such as enterprise business intelligence system 14 may perform the required calculation.

In the example of FIG. 2, computing device 16A includes calculation engine 25. Calculation engine 25 may include instructions operable by processors 20 to receive report specifications and perform calculations to generate reports 17. For example, calculation engine 25 may receive a request from report tool 34 to determine one or more calculations regarding specific data within multidimensional data of enterprise 4. In other examples, calculation engine 25 may receive a request to aggregate or sum data of a particular dimension, or a request to determine current values of items within a dimension. Calculation engine 25 may retrieve relevant enterprise data from data cubes 24 and/or enterprise business intelligence system 14 via network interface 23 and perform the requested calculations. The results of calculations performed by calculation engine 25 may be sent to other components associated with computing device 16A, such as report tool 34.

As shown in the example of FIG. 2, computing device 16A may include association module 28. Association module 28 may include instructions operable by processors 20 to receive input from UI module 26, and associate objects or data elements with one or more options (e.g., spatial options) based on the received input. For instance, association module 28 may associate a data element with a spatial location to create a definition for one or more report specifications 29. Report specifications 29 may be one or more documents stored on storage devices 22 that define the structure and content of reports 17. In some examples, report specifications 29 may consist of documents or files containing markup language (e.g., XML) instructions defining various requirements for a report. For instance, a report specification may define the layout of various charts and tables to be displayed in a report. Report specifications 29 may include one or more definitions specifying which data element or elements are to be included in parts of reports 17. The definitions within report specifications 29 may be created in a query language, (e.g., SQL), and may be executable by components of computing device 16A to cause retrieval of the defined data elements from underlying data sources. As one example, a definition may cause a report to include data elements whose value for a dimension corresponds to a chosen option or spatial location.

In the example of FIG. 2, computing device 16A includes report tool 34. Report tool 34 may include instructions operable by processors 20 to receive a request to generate a report (e.g., from user 12A) based on one or more of report specifications 29. Report tool 34 may query calculation engine 25 to obtain (e.g., from data cubes 24) the underlying data for the report, and generate one or more reports 17 based on the received data. In some examples, report tool 34 may output reports 17 locally (e.g., at computing device 16A). In other examples, report tool 34 may output reports 17 to enterprise business intelligence system 14, or to other computing devices connected to enterprise network 18.

Computing device 16A, as shown in the example of FIG. 2, includes UI module 26. UI module 26 may include instructions operable by processors 20 to interact with output devices 20 and/or input devices 32 to provide an interface to user 12A enabling selection of various objects or data elements (e.g., from the multidimensional enterprise data) for creation of one or more reports 17. That is, UI module 26 may display a GUI (e.g., at output devices 30) with which user 12A may interact (e.g., by using input devices 32) to cause computing device 16A to create or modify objects or data elements. For instance, user 12A may use the GUI provided by UI module 26 to create definitions for report specifications 29 and/or generate reports 17 based on report specifications 29.

UI module 26 may output information to user 12A via one or more of output devices 30 operatively coupled to computing device 16A. Output devices 30, in some examples, are configured to provide output to a user using tactile, audio, or video stimuli. Output devices 30 may include a presence-sensitive display, a sound card, a video graphics adapter card, or any other type of device for converting a signal into an appropriate form understandable to humans or machines. Additional examples of output devices 30 include a speaker, a cathode ray tube (CRT) monitor, a liquid crystal display (LCD), or any other type of device that can generate intelligible output. UI module 26 may receive input from user 12A via one or more of input devices 32. Input devices 32 may be part of computing device 16A, or may be communicatively coupled to computing device 16A. Input devices 32 may include a keyboard, a mouse, a touchsensitive or presence-sensitive display, a stylus, or any device operable to provide machine input.

In accordance with one or more aspects of the present disclosure, UI module 26 may provide user 12A with a way of associating objects or data elements with one or more spatial locations (e.g., in order to create a definition for report specifications 29) by displaying a plurality of overlay elements at output devices 30 to guide user 12A through the selection of various categorical or spatial options that can be associated with an object or data element. In the context of report generation, for example, UI module 26 may display a report generation UI at output devices 30, including a graphical representation of a data element (e.g., a graphical object) and a graphical representation of each of one or more spatial locations (e.g., graphical locations). Each graphical object may represent a data element that the user may include in the particular report. In some examples, the graphical objects may be included in a source container. For instance, a source container may be displayed for generating a revenue report. The displayed source container may contain graphical objects representing various product groups, various brand types, or other revenue groups. The graphical representations of spatial locations may each represent a spatial option that can be associated with at least one of the data elements. In some examples, the graphical locations may be displayed in accordance with the physical relationships between the corresponding spatial locations. For instance, if the graphical locations represent states in the United States, the graphical locations may be displayed in the correct geographical locations on a map of the United States. As another example, if the graphical locations represent store locations in a city, the graphical locations may have the same spatial relationships as the stores do to one another. That is, the displayed graphical representations of various spatial locations may be arranged or organized in such a way as to visually indicate the corresponding spatial locations.

Input devices 32 may receive input (e.g., performed by user 12A) to select a displayed graphical object (e.g., in order to include the corresponding data element in a report). UI module 26 may receive the indication of input and send the indication to association module 28. The indication sent to association module 28 may identify the selected graphical object, the data element that corresponds to the selected graphical object, the physical location of output devices 30 at which the displayed graphical object was selected, and/or other information.

Association module 28 may receive the indication from UI module 26 and determine a set of spatial locations. The determined set of spatial locations may be based at least in part on the data element that corresponds to the selected graphical object. For instance, each spatial location from the set of spatial locations may represent a location with which the data element can be associated. Based at least in part on the determined set of spatial locations, association module 28 may generate a plurality of overlay elements for display. That is, association module 28 may send data to UI module 26 to cause output devices 30 to display the plurality of overlay elements.

Responsive to receiving the data from association module 28, UI module 26 may cause one or more of output devices 30 to display, as part of the UI, the plurality of overlay elements. In some examples, the overlay elements may radiate outward from the selected graphical object. That is, each overlay element may be a "path" extending from a location of the UI at which the selected graphical object is located (e.g., a start location) to a respective graphical representation of a respective spatial location from the set of spatial locations. Each path formed by an overlay element may be associated with the respective spatial location.

UI module 26 may receive, from input devices 32, a second indication of input to traverse the selected object, from the start location and "through" one of the overlay elements to a second location. That is, UI module 26 may receive an indication of input corresponding to the user dragging the selected object from the start location, through the path of a chosen overlay element, and to a second location. For instance, the input may correspond to the user desiring to associate the selected object with the respective spatial location of the chosen overlay element. Responsive to receiving the second indication of input, UI module 26 may communicate the indication to association module 28.

In some examples, the second location may be within the chosen overlay element. That is, the user may drag the selected object from the start location and through part of the chosen overlay element. In other examples, the second location may be at or near the graphical representation of the spatial location that corresponds to the chosen overlay element. That is, the user may drag the selected object from the start location and completely through the chosen overlay element to the respective graphical representation. In any case, association module 28 may receive data corresponding to the second indication of input and may associate the selected object with the spatial location that corresponds to the chosen overlay element. For instance, association module 28 may associate the selected object with the respective spatial location when the user traverses the selected object all the way to the respective graphical representation of the spatial location or when the user traverses the selected object a sufficient distance through the chosen overlay element. In some examples, association module 28 may associate the selected object with the respective spatial location in response to the selected object being stationary for a sufficient time. For example, if the user traverses the selected object into the chosen overlay object and then waits (e.g., for 1 second, 2 seconds, or other time value), association module 28 may associate the selected object with the respective spatial location. In some examples, association module 28 may associate the selected object with the respective spatial location in response to the user releasing the selection. In some examples, association module 28 may associate the selected object with the respective spatial location in response to receiving additional or other inputs, such as a key press, a mouse button press or release, a touch gesture at a presence-sensitive display, or other input.

In the context of report generation, responsive to associating an object with a spatial location, association module 28 may communicate the association to report tool 34. Report tool 34 may receive information indicating the association and thereafter treat the selected object as associated with the spatial location for purposes of creating report specifications or generating reports 17. For instance, report tool 34 may receive subsequent information specifying a report in which to include the selected object. Report tool 34 may create a definition within a report specification based on the modified data element. Responsive to subsequent input, such as a request to generate the report, report tool 34 may cause calculation engine 25 to retrieve data based on the created definition.

In this way, association module 28 may allow user 12A to associate a selected object or data element with a spatial location by moving an input unit (e.g., a finger, a mouse cursor, a stylus, etc.) along a path from a start point and along a chosen overlay element that is displayed as part of a UI. That is, techniques of the present disclosure may provide an intuitive user interface for causing a computing device to associate data elements or objects with one or more options, such as spatial locations. Such associated data elements or objects may then be used to perform various tasks, such as for creating report specifications. The operations of association module 28 and computing device 16A are further described with respect to the specific examples of FIGS. 3, 4A-4C, and 5 below.

Figure 3A:
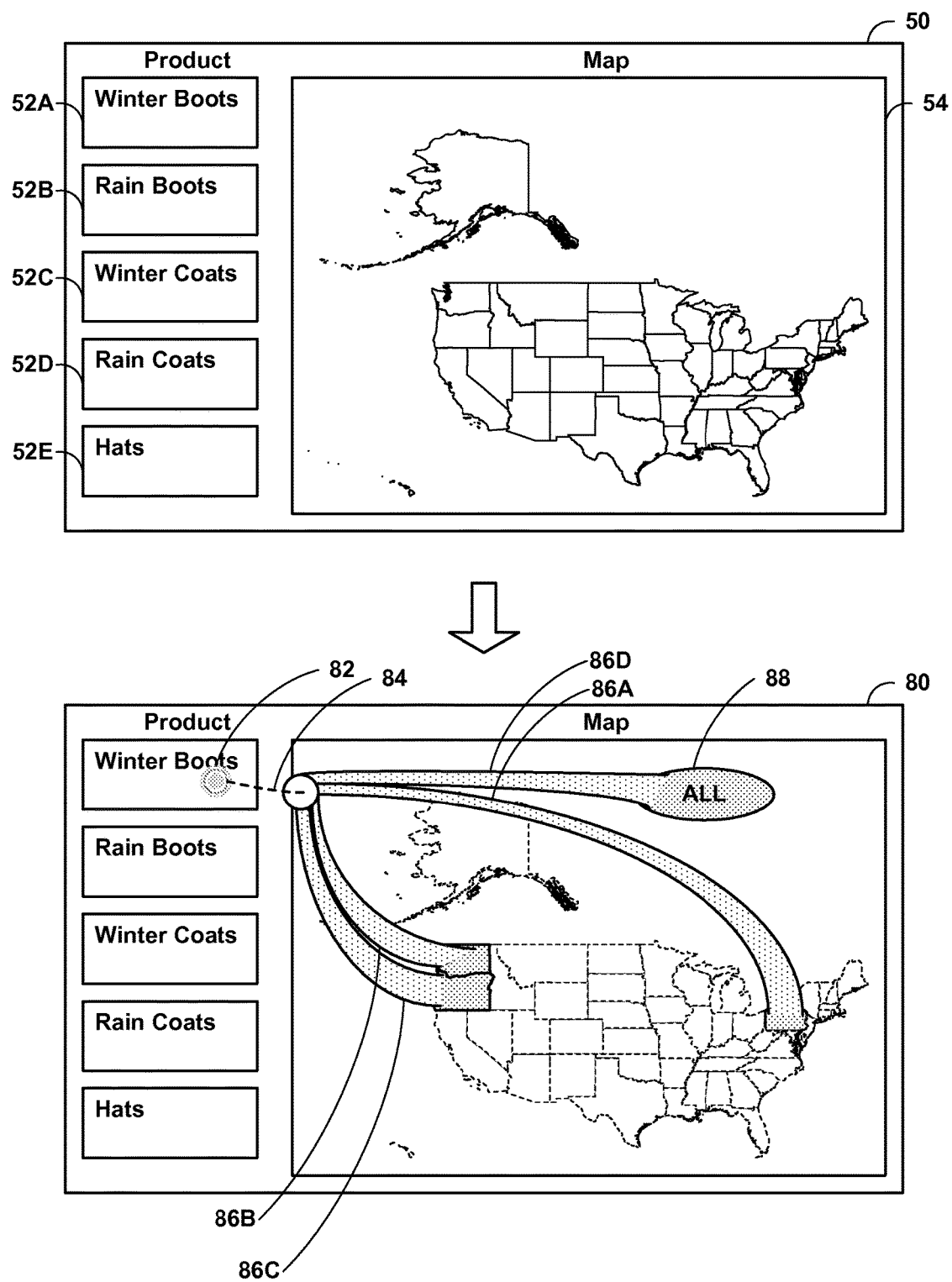
FIGS. 3A and 3B are block diagrams illustrating example GUIs for providing assisted spatial selection, in accordance with one or more aspects of the present disclosure.
Figure 3B:
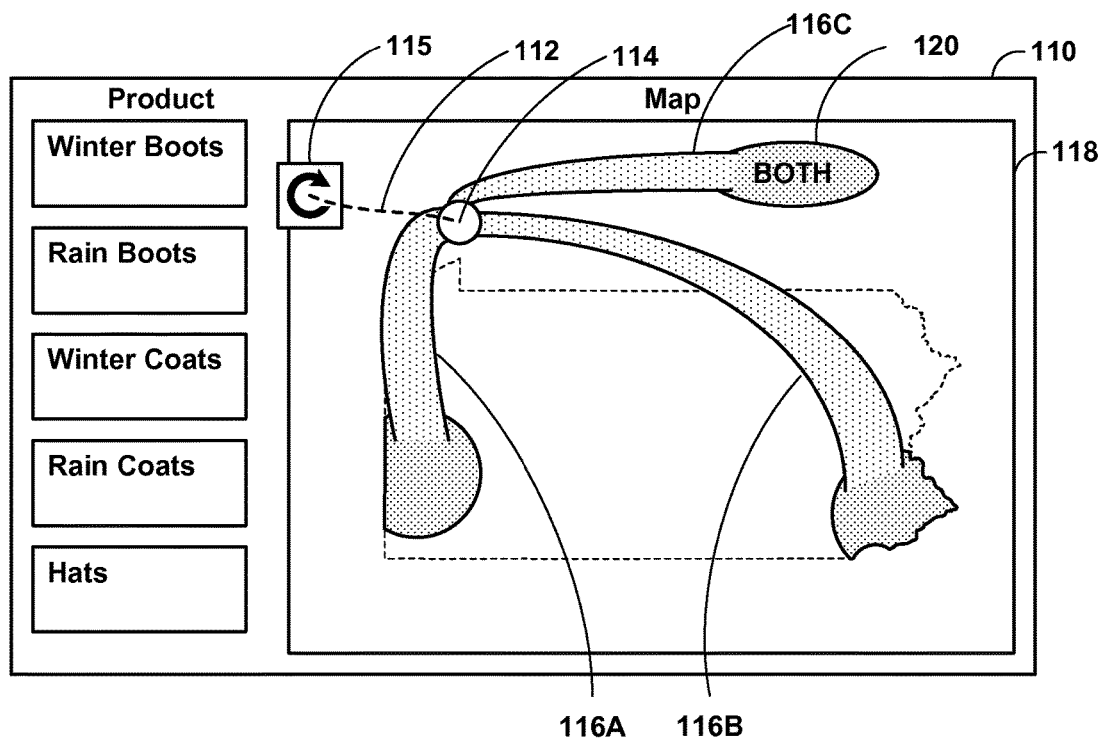

FIGS. 3A and 3B are block diagrams illustrating example GUIs 50, 80, 110 for providing assisted spatial selection, in accordance with one or more aspects of the present disclosure. For purposes of illustration only, the example shown in FIGS. 3A and 3B is described in the context of computing device 16A and enterprise business intelligence system 14 as shown in FIGS. 1 and 2. While described in the context of a report generation UI of an enterprise business intelligence system, techniques of the present disclosure may be readily applied to various other areas to provide assisted spatial selection. GUIs 50, 80, 110, as shown in FIGS. 3A and 3B, may be output by computing device 16A (e.g., at one or more of output devices 30).

In some example techniques, computing device 16A (e.g., UI module 26) may output a plurality of graphical overlay elements for display in response to receiving an indication of input to select a graphical representation of a data element or object. For instance, association module 28 may cause UI module 26 to output a plurality of overlay elements in a radial arrangement over a UI. Each overlay element may start at or near a user's selection of the graphical object (e.g., a start location) and span to a respective graphical representation, displayed as part of the UI, of an option that can be associated with the graphical object. Responsive to receiving input indicating a traversal of a chosen overlay element, association module 28 may associate the selected object with the option corresponding to the chosen overlay element. Thereafter, when incorporating the selected object in a report (e.g., as part of a definition in report specifications 29), the selected object may be associated with the chosen option.

In some examples, the selected object, as associated with the chosen option, may have no further options with which the object can be associated. In such instance, after associating the selected object with the chosen option, association module 28 may cause UI module 26 to cease displaying the overlay elements or collapse the elements. In other examples, the selected object, as associated with the chosen option, may have additional or other options with which the object may be associated (e.g., nested options). In such instance, after associating the selected object with the chosen option, association module 28 may cause UI module 26 to modify or update the display of the overlay elements in order to enable user 12A to select from a new set of options that may be associated with the selected object as associated with the chosen option. Such techniques are further illustrated in FIGS. 3A and 3B.

FIG. 3A includes GUI 50. GUI 50 may be output by computing device 16A in response to receiving input indicating a desire to select a product line for inclusion in one of reports 17. That is, computing device 16A may output a report generation UI to allow user 12A to add definitions to report specifications 29 and/or generate reports 17 (e.g., a revenue report from enterprise data of enterprise business intelligence system 14). Computing device 16A may receive input indicating user 12A would like to select a data element (e.g., a product line) to add to a report specification or report. Responsive to receiving the input, computing device 16A may display GUI 50 in order to allow user 12A to select a product line and associate the product line with one or more options (e.g., spatial locations).

GUI 50, as shown in the example of FIG. 3A, includes graphical objects 52A-52E (collectively, "graphical objects 52"). Each of graphical objects 52 may represent sales values for a product line of the enterprise as defined by business intelligence system 14. For instance, graphical object 52A may represent the entire value of all sales for "Winter Boots" throughout the various stores of the enterprise. In other words, each of graphical objects 52 may, in the example of FIGS. 3A and 3B, represent a data element that includes the sales values for the particular product line. In other examples, graphical objects 52 may represent any other possible data element or object, such as employees, revenue values, store locations, or other items.

In the example of FIG. 3A, GUI 50 also includes options area 54. Options area 54 may display one or more graphical representations of options that may be associated with at least one of graphical objects 52. For instance, each product line of the enterprise (represented by graphical objects 52) may be sold in various sales areas of the enterprise. That is, in various examples, data elements such as product sales values or inventory values may have a dimension that specifies a product line (e.g., a value that corresponds to one of graphical objects 52) and one or more dimensions that specify a location (e.g., a country dimension, a state dimension, a metro area or city dimension, and the like). In the example of FIGS. 3A and 3B, the sales areas of the enterprise may correspond to states and cities of the United States. As such, options area 54 includes graphical representations of each state. In other examples, sales areas may correspond to countries, geographic regions, store sales areas, or any other defined area. Furthermore, options area 54 may display more or other types of options, such as revenue values, product sub-types, or other types of options that may be associated with data elements or objects represented by graphical objects 52.

In any case, when selecting a product line for inclusion in a definition of report specifications 29, user 12A may desire to specify a sales region for the product line. For instance, user 12A may desire to select a state and/or city to which to limit the sales values in order to cause one of reports 17 to display the value of sales for a specific product line in a specific geographic area. In order to do so, user 12A may select one of graphical objects 52 corresponding to the desired product line, and drag the selection over to option area 54.

Turning to GUI 80 of FIG. 3A, UI module 26 may receive an indication of input 82 from input devices 32. In some examples, input 82 may correspond to input provided by electromechanical input devices, such as a computer mouse or stylus pen (e.g., when GUI 50 is displayed at an LCD or the like). In other examples, input 82 may correspond to input performed at a touch-pad or presence-sensitive screen. Input 82 may, for instance, be a click-and-hold selection received via a computer mouse, or a touch-and-hold selection received via a touch screen. In other examples, input 82 may correspond to a single click of the mouse button or a tap gesture received via the touch screen, and subsequent input may not require a continuing selection. That is, in various examples, the indication of input may be the result of user 12A using a mouse, a keyboard, a touchpad or presence-sensitive display, or providing input in any other way. In any case, UI module 26 may provide the indication of input to association module 28.

Association module 28 may receive the indication of input 82. As shown in GUI 80, the indication of input 82 may indicate a selection of graphical object 52A, "Winter Boots." In some examples, if association module 28 subsequently receives an indication of input releasing the selection (e.g., from user 12A releasing the mouse button or removing a finger from the touch screen), association module 28 may do nothing, or perform other actions unrelated to the present disclosure. If, however, association module 28 receives an indication of sliding input 84 (e.g., moving graphical object 52A to options area 54) subsequent to receiving an indication of input 82, association module 28 may determine a set of options with which the data element corresponding to graphical object 52A can be associated. That is, association module 28 may determine which of the spatial locations (e.g., states of the United States) can be associated with the winter boots data element. In the example of FIGS. 3A and 3B, association module 28 may determine (e.g., based on data stored at data cubes 24 and/or data stored at enterprise business intelligence system 14) that the winter boots data element can be associated with the state of Washington, the state of Oregon, and/or the state of Pennsylvania.

Based on the determination of spatial locations with which the winter boots data element can be associated, association module 28 may cause UI module 28 to output, for display as part of GUI 80, a plurality of overlay elements 86A-86D (collectively, "overlay elements 86"). Each of overlay elements 86 may include a respective boundary that forms a respective path from a start location (e.g., the end of sliding input 84) and to a respective graphical representation of a respective spatial location option. For instance, as shown in GUI 80, overlay element 86A forms a path from the end of sliding input 84 to the state of Pennsylvania. Overlay elements 86B and 86C form paths from the end of sliding input 84 to the states of Washington and Oregon, respectively. Overlay element 86D forms a path from the start location to graphical representation 88, labelled "ALL." Graphical representation 88 may represent a specialized option that corresponds to a selection of all the available options. That is, graphical representation 88 may, in the example of FIGS. 3A and 3B, represent a specialized spatial location that includes Pennsylvania, Washington, and Oregon.

Overlay elements 86 may be objects overlying an existing GUI. In some examples, overlay elements 86 may have a graphical boundary as shown in FIG. 3A. In other examples, overlay elements 86 may be differentiated from the rest of GUI 80 in some other manner. Overlay elements 86 may, for instance, be output for display in a different color, a different pattern, or a different hue when compared to the rest of GUI 80. In various examples, overlay elements 86 may be opaque, semi-transparent, or completely transparent. Overlay elements 86 may each provide a path from a current selection of a graphical object to one or more options that can be associated with the selected graphical object. For instance, end points may correspond to selectable characteristics of a data element represented by the selected graphical object, such as when the graphical object is to be used in a report option.

In some examples, graphical representations of options that can be associated with the selected graphical object may be displayed in a modified manner compared to graphical representations of options that cannot be associated with the graphical object. For instance, as shown in GUI 80, the states of Pennsylvania, Washington, and Oregon, as well as graphical representation 88, are all displayed in a manner different than other states, such as Minnesota or Texas. Such visual differentiation may include different color, different shading, different outline, different fonts or font styles, different sizes or shapes, or any other means of differentiation. In other examples, graphical representations of options that can be associated with the selected graphical object may be displayed in the same manner as graphical representations of options that cannot be associated with the graphical object.

In some examples, the input unit of user 12A (e.g., the mouse cursor) may be restricted to allow movement only within the boundaries of overlay elements 86 such that the input unit cannot leave the confines of overlay elements 86 except through the displayed outlets (e.g., the beginnings and ends of overlay elements 86). In other examples, movement may be "sticky," or semi-restricted. In yet other examples, movement past the boundary of one of overlay elements 86 may result in association module 28 causing UI module 26 to cease display of some or all of overlay elements 86.

In the example of GUI 80, overlay elements 86 depict four paths. Each path may be associated with a report option of the winter boots data element and may specify the data source or sources to be included in a report. In other words, the paths may serve to redefine the data element such that when user 12A traverses the corresponding overlay element with an input unit (e.g., a finger or mouse cursor), the resulting data element corresponding to graphical object 52A may have characteristics different than the data element corresponding to graphical object 52A as originally selected. User 12A may, in one example, desire to create a report specification including a definition specifying the inclusion of sales values of only Pennsylvania or a city of Pennsylvania. Consequently, The user may begin to traverse the mouse cursor overlay element 86A.

Turning now to GUI 110 of FIG. 3B, UI module 26 may receive an indication of input corresponding to a traversal of at least a part of overlay element 86A (e.g., traversal input 112). UI module 26 may provide the indication to association module 28. Responsive to receiving traversal input 112, association module 28 may associate the data element corresponding to graphical object 52A (e.g., the winter boots data element) with the option corresponding to the chosen overlay element (e.g., Pennsylvania). In some examples, association module 28 may perform the association if traversal input 112 corresponds to a traversal of the entire overlay element. That is, association module 28 may perform the association if traversal input 112 is from the start point of overlay element 86A to the end of overlay element 86A (e.g., to the graphical representation of Pennsylvania). In other examples, association module 28 may perform the association if traversal input 112 corresponds to a traversal that is a sufficient distance through overlay element 86A. For instance, association module 28 may perform the association if when the traversal is more than half of the way through the overlay element, more than a quarter of the way through, more than three inches into the overlay element, more than one inch into the overlay element, or some other measure of proportion or distance. In yet other examples, association module 28 may perform the association if traversal input 112 corresponds to a traversal of at least a portion of overlay element 86A followed by a pause of sufficient duration. That is, if user 12A traverses a part of the overlay element, then holds the cursor in the same location for a sufficient amount of time (e.g., 0.25 seconds, 0.5 seconds, one second, or other duration), association module 28 may associate the data element with the option. Various other methods of determining when to associate the data element with the option may also be used in accordance with the techniques described herein, such as performing the association in response to receiving further input (e.g., a click of a mouse button, a release of a mouse button, a double-tap, a release of a tap gesture, a keyboard input, or other input), or other methods.

In the example of FIGS. 3A and 3B, association module 28 may perform the association in response to traversal input 112 extending from the start location and to a second location (e.g., location 114). Location 114 may be far enough through overlay element 86A to determine that it is statistically likely that user 12A intended to traverse overlay element 86A as opposed to any others of overlay elements 86. In any case, responsive to receiving an indication of traversal input 112, association module 28 may associate the winter boots data element with the Pennsylvania option.

In some examples, responsive to receiving traversal input 112, association module 28 may determine a second set of options that can each be associated with the selected data element or object, as it is associated with the chosen option. That is, association module 28 may associate the selected object with the chosen option, then determine whether there are any further options (e.g., sub-options or nested options) that can be associated with the selected object, as modified. In the example of FIGS. 3A and 3B, for instance, association module 28 may determine that the winter boots data element, associated with the Pennsylvania option, can be associated with a Pittsburgh option and/or a Philadelphia option.

Association module 28 may cause UI module 26 to output, for display, a new or updated plurality of overlay elements, such as overlay elements 116A-116C (collectively, "overlay elements 116") of GUI 110. Overlay elements 116 may allow user 12A to select one or more sub-options to associate with the modified data element, similar to the process for associating the original data element with options. For instance, user 12A may traverse some or all of overlay element 116A or overlay element 116B to associate the winter boots data element (already associated with Pennsylvania) with the Pittsburgh option or the Philadelphia option, respectively. User 12A may traverse overlay element 116C, to graphical representation 120, labelled "BOTH," to associate the data element with both the Philadelphia and Pittsburgh options.

In some examples, such as where a user traverses only a portion of a given overlay element and then "drops" an object in any part of the overlay element (e.g., releases a click-and-hold mouse input, or releases a finger from a presence-sensitive display) the object may automatically be associated with the option that corresponds to the overlay element. If further options exist, the object may be further associated with a default sub-option. For instance, if user 12A indicates a release of graphical object 52A while within overlay element 86A, association module 28 may associate graphical object 52A with Pennsylvania and with a default option (e.g., graphical representation 120). In this way, techniques disclosed herein may limit the effort needed to associate objects with specific options.

In some examples, association module 28 may cause UI module 26 to output, for display, a graphical object that may allow user 12A to undo the association. For instance, in the example of FIG. 3B, GUI 110 includes return element 115. If user 12A desires to disassociate the winter boots data element with Pennsylvania (e.g., because the association was made in error), user 12A may drag graphical object 52A from location 114 to return element 115. Responsive to receiving an indication of input corresponding to user 12A dragging graphical object 52A to return element 115, association module 28 may disassociate the winter boots data element from the Pennsylvania option.

In some examples, such as the example shown in FIGS. 3A and 3B, association module 28 may cause UI module to change or modify the display of options area 54. For instance, options area 118 of GUI 110 includes a close-up view of Pennsylvania in order to facilitate selection from the second set of options. In other examples, such as when sub options are easily visible in options area 54 as originally displayed, association module 28 may not cause UI module 26 to change the output of the options area.

In the example of FIGS. 3A and 3B, association module 28 may receive an indication of input corresponding to user 12A traversing overlay element 116B as shown in the example of GUI 110. Responsive to receiving the indication of input, association module 28 may associate the winter boots data element, already associated with the Pennsylvania option, with the Pittsburgh option. In some examples, such as where no further options may be associated with the data element, association module 28 may cause UI module 26 to cease displaying overlay elements 116. Computing device 16A may provide a GUI allowing user 12A to include the data element, as associated, in a report specification. In other examples, such as where the data element may be further associated with a specific store in the Pittsburgh region, a specific brand or type of winter boot, or other options, Association module 28 may cause UI module 26 to output a new plurality of overlay elements to assist in the association.

Upon receiving an indication of input to include a data element, as associated, in a report specification, association module 28 may create one or more definitions for report specifications 29 specifying data sources based on the data element as associated. In this manner, association module 28 may provide a way for users to choose data elements having various selectable options within enterprise business intelligence system 14 and create definitions for report specifications based on those data elements. Techniques of the present disclosure allow users to specify various options of a desired data element with a single gesture and create definitions for report specifications based on the data element or elements selected.

Figure 4A:
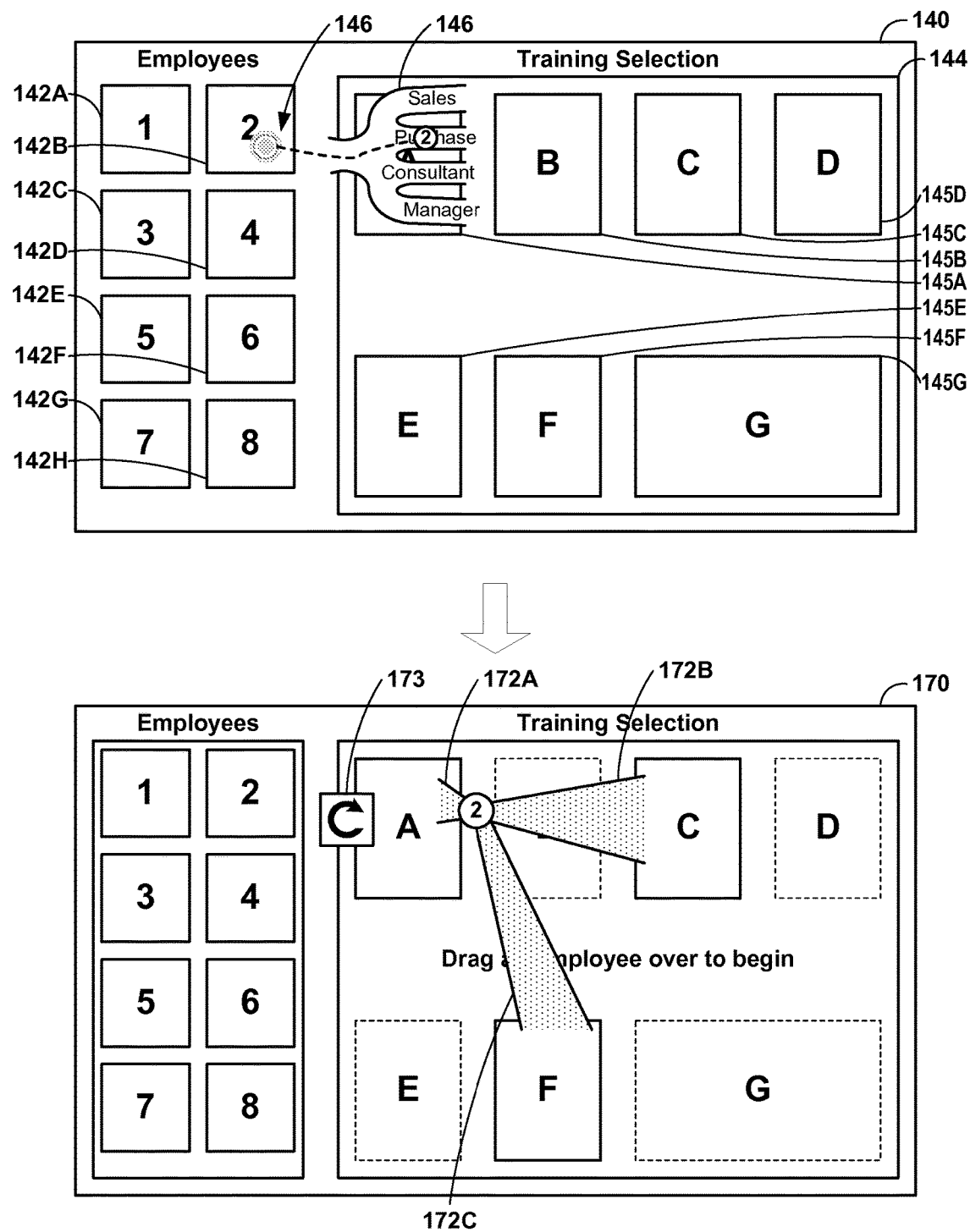
FIGS. 4A-4C are block diagrams illustrating example GUIs for providing assisted spatial selection, in accordance with one or more aspects of the present disclosure.
Figure 4B:
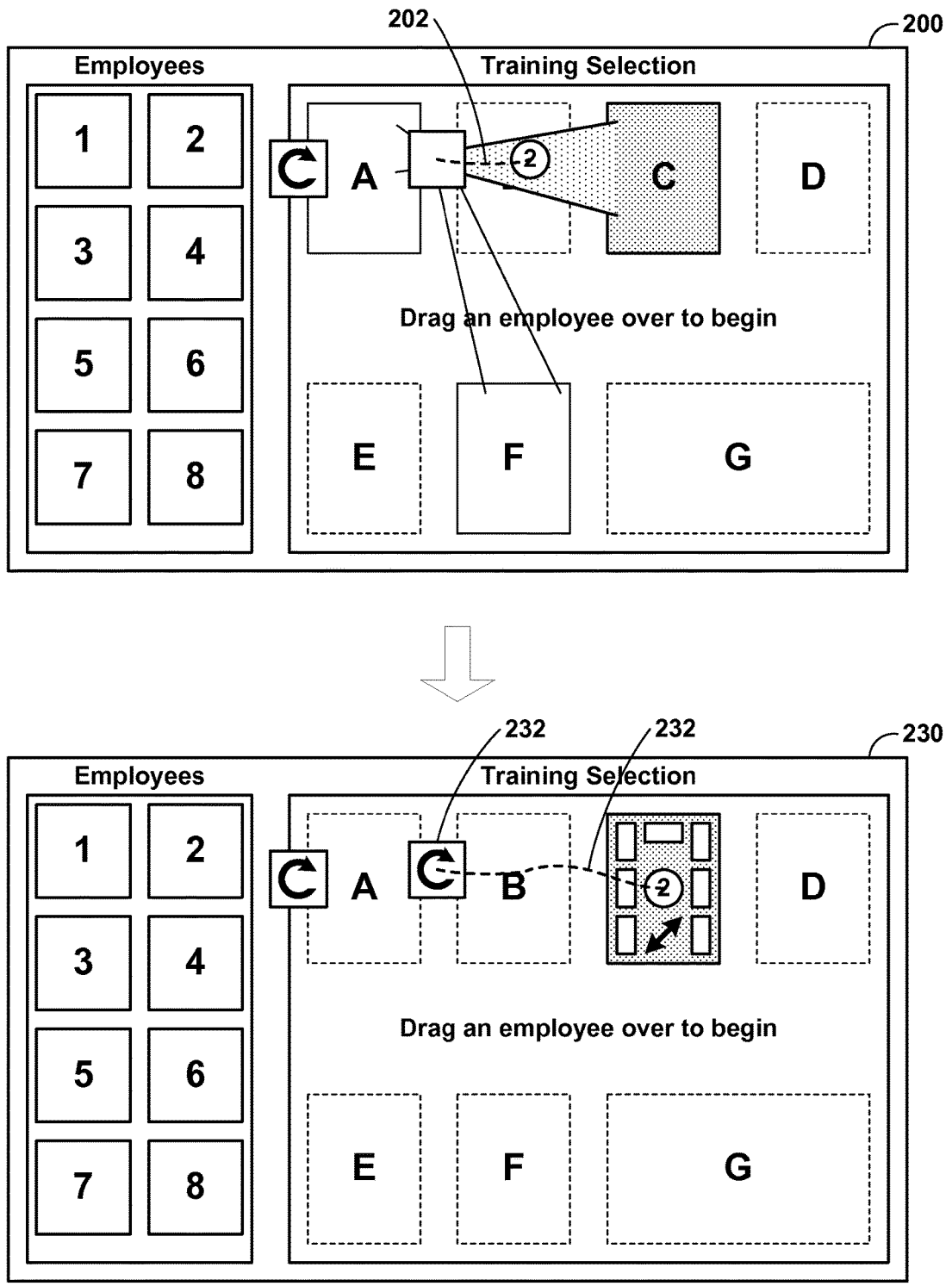
Figure 4C:
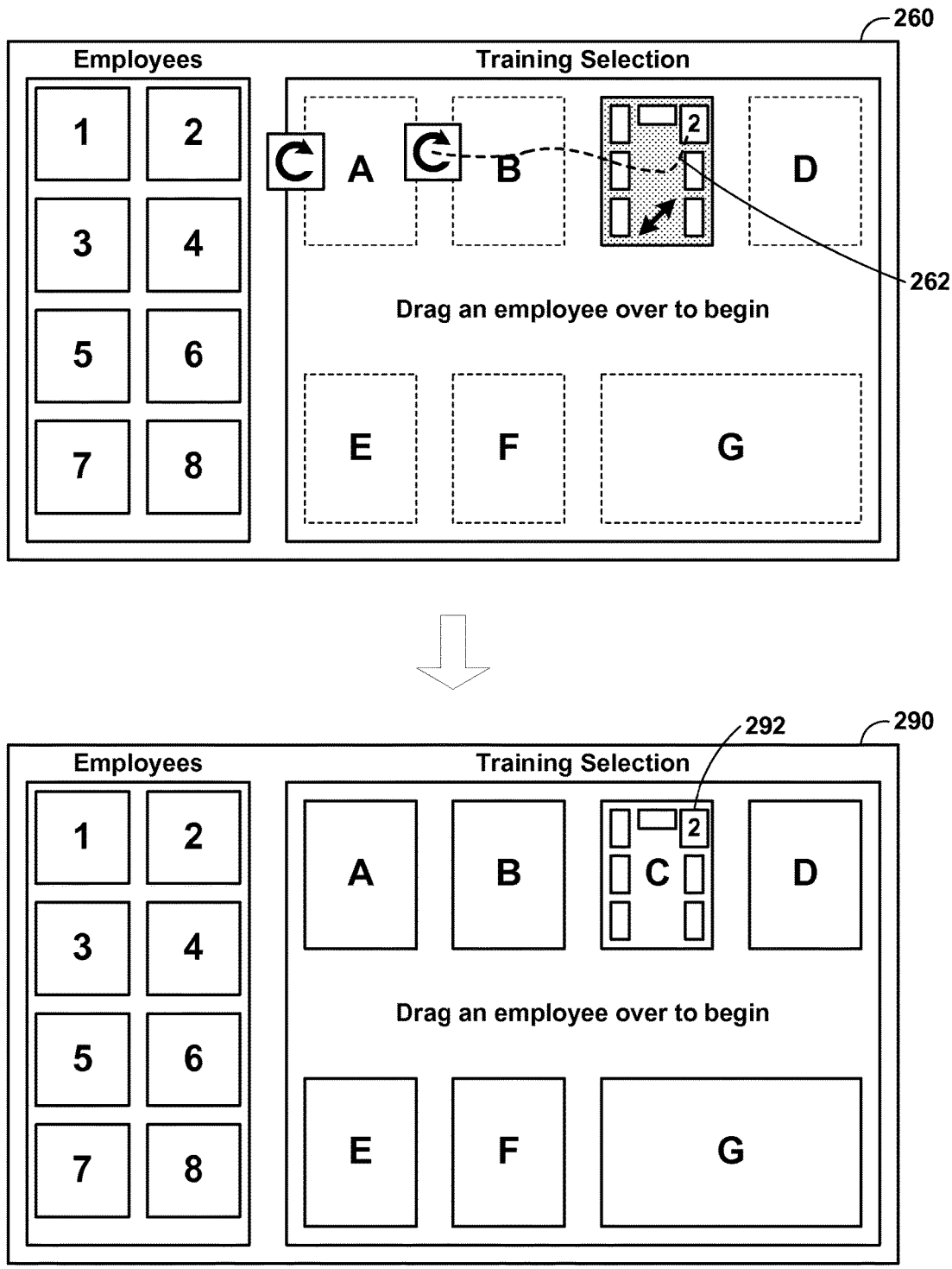

FIGS. 4A-4C are block diagrams illustrating example GUIs for providing assisted spatial selection, in accordance with one or more aspects of the present disclosure. For purposes of illustration only, the example of FIGS. 4A-4C is described below within the context of computing device 16A, as shown in FIGS. 1 and 2. GUIs 140, 170, 200, 230, 260, and 290 may, for example, be output by UI module 26 for display at one or more of output devices 30.

In some examples, techniques of the present disclosure may enable user 12A to associate objects or data elements with various spatial options and/or more abstract options by selecting the object and traversing a number of overlay elements. For instance, user 12A be a human resources coordinator and may have a list of new hires he or she needs to assign to the right category (e.g. a training session the employee will attend). Once a training session is chosen, user 12A may also need to select what chair the employee will be assigned to. In other words, user 12A may want to associate objects that represent employees with a role in an enterprise (e.g., an abstract option) and then associate the objects with training session tables (e.g., a spatial option) specific to the employee's associated role.

In the example of FIG. 4A, computing device 16A may display GUI 140 as part of a UI for assigning new employees to various training sessions. GUI 140 includes graphical objects that represent new employees (e.g., employee objects 142A-142H) as well as options area 144. While employee objects 142A-142H are shown as simple squares in the present example, various other representations, such as pictures or text, may be used in accordance with the techniques described herein.

Options area 144 includes table options 145A-145G (collectively, "table options 145"). Table options 145 may be graphical representations of spatial locations (e.g., tables) for the various training sessions. Some employee training sessions may be restricted to employees having certain roles, and thus which of table options 145 an employee may be associated with may depend on which role the employee is assigned to. In the example of FIGS. 3A-3C, an employee associated with a sales role may be able to do training sessions at tables A, B, or E (corresponding to table options 145A, 145B, or 145E). An employee associated with a purchase role may be able to do training sessions at tables A, C, or F. An employee associated with a consultant role may be able to do training sessions B, D, or E, and an employee associated with a manager role may be able to do training sessions C, E, or F. In order to assist in selecting from among table options 145, computing device 16A may provide a plurality of overlay elements. For ease of understanding, an employee may sit at any chair of a proper table in the example of FIGS. 3A-3C. In other examples, employees may be restricted to certain chairs at each training session.

In the example of FIGS. 3A-3C, user 12A may provide input to computing device 16A to select one of employee objects 142A-142H and associate the employee object with a particular role. As one example method for associating an employee object with a role, computing device 16A may provide an overlay element having a plurality of paths through which user 12A may traverse the employee object to select a role to associate with the employee object. That is, as shown in FIG. 4A, association module 28 may receive an indication of input 146 to select employee object 142B and move or "drag" employee object 142B to options area 144. Association module 28 may cause UI module 26 to output overlay element 148. User 12A may traverse overlay element 148 by moving the cursor through the path of overlay element. 148 labelled "Purchase." Consequently, user 12A may have associated employee object 142B with the purchase role.

GUI 140 provides one example method of associating an employee object with a role and various other methods may be used in accordance with the present disclosure. For instance, employee objects may be already associated with a role, or may be associated with a role by using a dropdown list or menu, or through any other means. In any case, responsive to associating employee object 142B with a purchase role, computing device 16A may output GUI 170 of FIG. 4A to enable user 12A to associate an employee object having a specific role with one of table options 145.

GUI 170, as shown in the example of FIG. 4A, includes modified employee object 171. Modified employee object 171 may represent employee object 142B as associated with the purchase role. Because employees in different roles can be associated only with particular training sessions, users may, in some examples, erroneously place employees in the incorrect training. In order to minimize potential errors, association module 28 may determine a set of available table options and provide guided selection. That is, based on the indication of input to associate employee object 142B with the purchase role, association module 28 may determine a set of table options (e.g., spatial locations) with which modified employee object 171 can be associated. Because modified employee object 171 is in the purchase role, association module 28 may determine that modified employee object 171 can be associated with table option 145A, 145C, or 145F. Association module 28 may then cause UI module 26 to output overlay elements 172A-172C (collectively "overlay elements 172") as part of GUI 170. Each of overlay elements 172 may correspond to a respective spatial location that can be associated with modified employee object 171. For instance, overlay element 172A may correspond to table option 145A. Overlay elements 172B and 172C may correspond to table options 145C and 145F, respectively. As shown in GUI 170, each of overlay elements 172 includes a respective boundary that forms a respective path from modified employee object 171 (e.g., the start location) to the graphical representation of a respective spatial location (e.g., one of table options 145).

In some examples, overlay elements may be shown using two lines to draw a path, such as overlay elements 172 of GUI 170. In other examples, overlay elements may be represented by a single line or by no line. That is, overlay elements may, in various examples, be represented by any possible indication of a connection between the start location and a spatial location. For instance, an overlay element may be a virtual "shadow" cast across the UI, a dotted line, a shaded area, a differently colored portion, or any other visual indication of a path.

In some examples, Association module 28 may cause UI module 26 to output options with which an object can be associated in a different visual style or format than those options with which the object cannot be associated. In the example of FIG. 3A, for instance, table options 145A, 145C, and 145F may be displayed with a thicker, solid line, while table options 145B, 145D, 145E, and 145G may be displayed with a thinner, dashed line. Various other methods of visual differentiation may be used, such as different colors, different shadings, different line styles, different fonts or font styles, different sizing, or any other traits that may visually differentiate possible options from options that are not possible.

GUI 170, in the example of FIG. 3A, also includes return element 173. Return element 173 may provide user 12A with the option to return to selecting the previous option (e.g., selection of a role). That is, user 12A may move the cursor to return element 173 in order to cause association module 28 to disassociate employee object 142B from the purchase role.

Turning now to GUI 200 of FIG. 4B, user 12A may desire to have employee 2 (e.g., represented by modified employee object 171) attend the table C training Consequently, computing device 16A may receive input 202 indicating a traversal from the start location and to a second location, at least a part of the way through overlay object 172B. Responsive to receiving an indication of input 202, association module 28 may, in some examples, cause UI module 26 to modify the display of overlay elements 172 and/or of table options 145. For instance, as shown in GUI 200, responsive to receiving input traversing a part of overlay element 172B, computing device 16A may display overlay elements 172A and 172C without shading. Additionally, computing device 16A may shade table option 145C because it corresponds to the partially-traversed overlay element. In other examples, a partial traversal of an overlay element may not cause computing device 16A to change display of overlay elements or associated spatial options.

In some examples, user 12A could "drop" modified employee object 171 in any part of overlay element 172B and the object may be associated with table option 145C. That is, in some examples dropping an object in a chosen overlay element may cause the object to be associated with the spatial option corresponding to the chosen overlay element. Furthermore, association module 28 may cause UI module 26 to display the object being "moved" (e.g., via animation) to the spatial location corresponding to the overlay element. In some examples, if further options exist, the object may be further associated with one or more default sub-options.

In the example of FIGS. 3A-3C, association module 28 may associate modified employee object 171 with a chosen table option once user 12A has traversed the cursor completely through an overlay element. For example, after association module 28 receives an indication of input traversing modified employee object 171 all the way through overlay element 172B, association module 28 may associate modified employee object 171 with table option 145C. In other examples, association module 28 may associate objects with a spatial option in response to the user traversing a portion of the overlay element or in response to providing some other input, such as a mouse click or a tap gesture, while within the overlay element.

Responsive to receiving the indication of input to traverse overlay element 172B, association module 28 may determine options with which the modified employee object (e.g., modified employee object 171, as associated with table option 145C) can be associated. If no further options are available, association module 28 may record the association (e.g., in one of storage devices 22) of employee 142B with the purchase role and table option 145C, or perform one or more other operations. If further options are available (e.g., sub-options), association module 28 may modify the displayed GUI to allow for selection of the further options. For instance, in the example of FIGS. 4A-4C, association module 28 may cause UI module 26 to output GUI 230 for display in response to receiving an indication of input 232.

GUI 230 includes return element 234. Return element 234 may be similar to return element 173 of GUI 170. That is, return element 234 may enable user 12A to "undo" the previous decision and return to selecting a table option for modified employee object 171. In some examples, association module 28 may cause UI module 26 to output only one return element for display at a time. That is, user 12A may be able to step through the previous associations and actions one at a time. In other examples, such as the example of FIG. 3B, association module 28 may cause UI module 26 to output more than one return element for display.

Table option 245C, as shown in GUI 230, includes seven objects representing seats at the table. If a specific seat is desired within table option 145C, user 12A may drag modified employee object 171 (now associated with table option 145C) to a seat. If user 12A does not desire to specify a seat, user 12A may simply release modified employee object 171 or provide other input to associate the object with a default seat within the associated table option. In some examples, association module 28 may cause UI module 26 to limit movement of the cursor to within table option 145C. That is, UI module 26 may restrict cursor movement using hard boundaries, soft boundaries or "stickiness" or other methods. In other examples, association module 28 may not cause UI module 26 to limit cursor movement.

Turning to FIG. 4C, user 12A may desire to associate the employee (represented by modified employee object 171) in the upper right seat of table option 145C. Consequently, association module 28 may receive an indication of input 262, as shown in GUI 260. Responsive to receiving input 262, association module 28 may cause UI module 26 to display the chosen seat in a slightly larger manner, in order to signify the pending association.

If user 12A desires to select a different seat to associate with the employee, user 12A may move the object to another seat. If user 12A is satisfied with the pending association, however, user 12A may release the selection of modified employee object 171 or otherwise provide input to cause association module 28 to associate the upper right seat with modified employee object 171 (as previously associated with table option 145C). After associating employee 2 with the purchase role, with table option 145C, and specifically with the upper right seat of table option 145C, association module 28 may cause UI module 26 to output GUI 290 for display. As shown in GUI 290, table option 245C shows employee 2 occupying seat option 292. User 12A may subsequently repeat the process to assign another employee (e.g., represented by employee objects 142A and 142C-142H) in a similar fashion.

By outputting overlay elements for display as part of a selection UI, techniques of the present disclosure may enable a computing device to assist users in selection of one or more spatial options. Furthermore, the techniques described herein may allow for easy and fluid switching between selection of spatial options that may have a real-world representation (e.g., geographical locations or spatial relationships) and selection of more abstract options that may not have real-world relationships (e.g., employee roles, revenue values, or other abstract differentiations).

Figure 5:
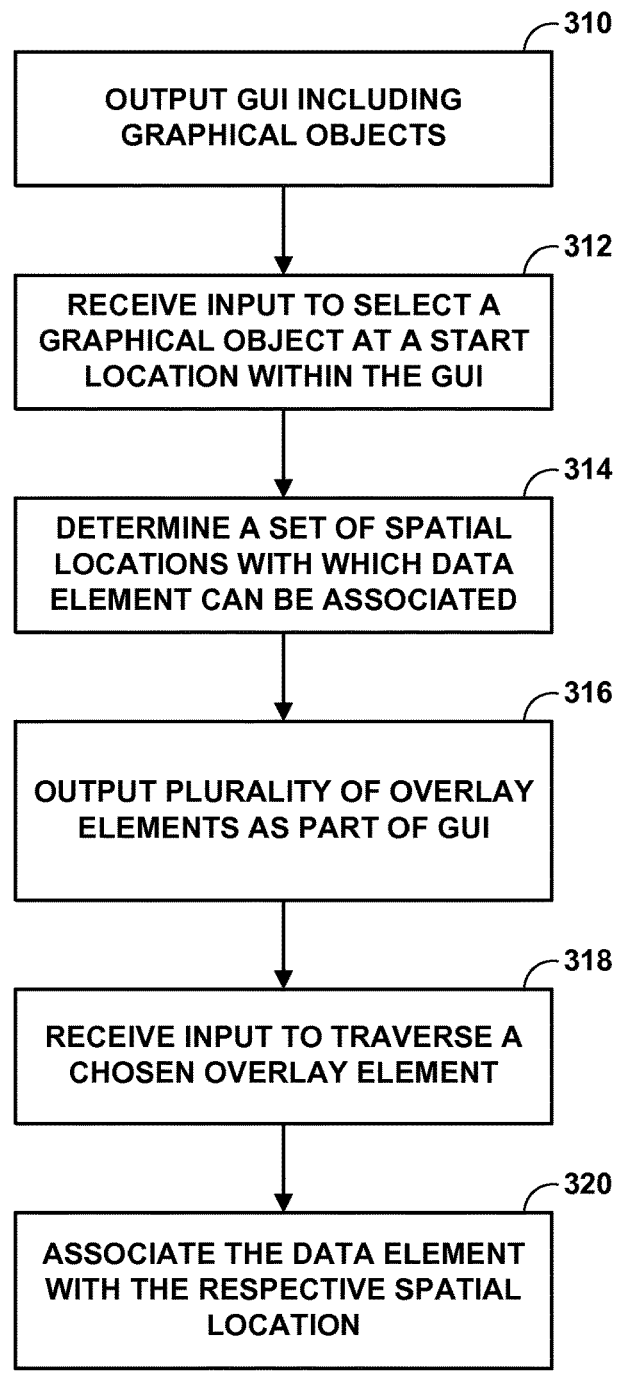
FIG. 5 is a flowchart illustrating example operations of a computing device for providing assisted spatial selection, in accordance with one or more aspects of the present disclosure.

FIG. 5 is a flowchart illustrating example operations of a computing device for providing assisted spatial selection, in accordance with one or more aspects of the present disclosure. For purposes of illustration only, the example process is described below within the context of computing device 16A, as shown in FIGS. 1 and 2.

In the example of FIG. 5, computing device 16A may output, for display, a GUI that includes one or more graphical objects (310). The graphical objects may represent one or more data elements from a data source (e.g., enterprise business intelligence system 14). Computing device 16A may receive a first indication of input to select a graphical object from the one or more graphical objects (312). The selected graphical object may represent a data element from the one or more data elements. In some examples, the selection may occur at a start location within the GUI. Responsive to receiving the first indication of input, computing device 16A may determine a set of spatial locations with which the data element can be associated (314). The set of spatial locations may be determined based at least in part on the data element, and each of the spatial locations may comprise a location within a three-dimensional (3D) physical environment.

Computing device 16A may output, for display, a plurality of overlay elements as part of the GUI (316). Each of the plurality of overlay elements may comprise a respective boundary that forms a respective path from the start location to a respective graphical representation of a respective spatial location from the set of spatial locations. Computing device 16A may receive a second indication of input to traverse a chosen overlay element from the plurality of overlay elements (318). For instance, the traversal may be from the start location and to a second location within the respective path of the chosen overlay element. Responsive to receiving the second indication, computing device 16A may associate the data element with the respective spatial location corresponding to the chosen overlay element from the plurality of overlay elements (320).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various aspects of the disclosure have been described. These and other aspects are within the scope of the following claims.

What is claimed is:

1. A method comprising:

outputting, by a computing device and for display, a graphical user interface (GUI) comprising one or more graphical objects representing one or more data elements from a data source;

receiving, by the computing device, a first indication of input to select a graphical object from the one or more graphical objects, the selected graphical object representing a data element from the one or more data elements, wherein the selection defines a start location within the GUI that is outside of an options area in the GUI;

receiving, by the computing device, an indication of a sliding input that moves the selected graphical object from the start location into a location within the options area in the GUI without outputting for display an overlay element that forms a path from the start location outside of the options area in the GUI to the location within the options area in the GUI;

determining, by the computing device and based at least in part on the data element, a set of spatial locations with which the data element can be associated, wherein each of the spatial locations comprises a location within a three-dimensional (3D) physical environment, and wherein the options area encompasses graphical representations of the set of spatial locations in the GUI;

responsive to the selected graphical object moving into the location within the options area in the GUI as a result of the sliding input, outputting, by the computing device and for display, a plurality of overlay elements and an additional graphical representation as part of the GUI, wherein the plurality of overlay elements comprises a set of two or more overlay elements and an additional overlay element, wherein each overlay element of the set of two or more overlay elements comprises a respective boundary that forms a respective path from the location within the options area to a respective graphical representation of a respective spatial location from the set of spatial locations, wherein the additional graphical representation represents a specialized option that corresponds to a grouping of two or more spatial locations from the set of spatial locations, wherein the additional graphical representation is distinct from the graphical representations of the set of spatial locations, wherein each spatial location of the grouping of two or more spatial locations is associated with a respective overlay element of the set of two or more elements, wherein the additional overlay element comprises a respective boundary that forms a respective path from the location within the options area to the additional graphical representation, and wherein the respective paths for each of the plurality of overlay elements correspond to Business Intelligence (BI) report options associated with the respective one or more spatial locations;

receiving, by the computing device, a second indication of input to traverse a chosen overlay element from the plurality of overlay elements, the traversal being from the start location and to a second location within the respective path of the chosen overlay element from the plurality of overlay elements;

responsive to receiving the second indication, associating, by the computing device, the data element with the respective one or more spatial locations corresponding to the chosen overlay element from the plurality of overlay elements, and associating the data element associated with the respective one or more spatial locations with a respective BI report option associated with the respective one or more spatial locations in a BI report specification, thereby modifying the BI report specification based on the first indication of input and the second indication of input; and generating an output for a BI report based on the BI report specification in which the data element with the respective BI report option is associated with the respective one or more spatial locations.

2. The method of claim 1, wherein the set of spatial locations with which the data element can be associated comprises a first set of spatial locations with which the data element can be associated, wherein the plurality of overlay elements comprises a first plurality of overlay elements, and wherein associating the data element with the respective spatial location corresponding to the chosen overlay element from the first plurality of overlay elements comprises forming a spatially-associated data element, the method further comprising:

responsive to receiving the second indication, determining, by the computing device and based at least in part on the spatially-associated data element, a second set of spatial locations with which the spatially-associated data element can be associated, each of the second set of spatial locations being defined at least partially located within the respective spatial location corresponding to the chosen overlay element from the first plurality of overlay elements;

outputting, by the computing device and for display, a second plurality of overlay elements as part of the GUI, each of the second plurality of overlay elements comprising a respective boundary that forms a respective path from the second location to a respective graphical representation of a respective spatial location from the second set of spatial locations;

receiving, by the computing device, a third indication of input to traverse a chosen overlay element from the second plurality of overlay elements, the traversal being from the second location and to a third location within the respective path of the chosen overlay element from the second plurality of overlay elements; and responsive to receiving the third indication, associating, by the computing device, the data element with the respective spatial location corresponding to the chosen overlay element from the second plurality of overlay elements.

3. The method of claim 1, wherein the set of spatial locations comprises a set of geographical locations, the method further comprising outputting, by the computing device and for display, a geographical map as part of the GUI, the geographical map including the respective graphical representation of geographical areas corresponding to each respective spatial location from the set of spatial locations, such that the selected graphical object representing the data element corresponds to a selected geographical area, and the data element associated with the respective spatial location is associated with a respective BI report option associated with the selected geographical area in a BI report specification.

4. The method of claim 3, further comprising, responsive to receiving the second indication of input, outputting, by the computing device and for display, a second geographical map as part of the GUI, the second geographical map including a respective graphical representation of each of a second set of spatial locations, each of the second set of spatial locations being contained within the respective spatial location corresponding to the chosen overlay element from plurality of overlay elements.

5. The method of claim 1, further comprising:
outputting, by the computing device and for display, a visual representation of the data element as part of the GUI; and
responsive to receiving the first indication of input, restricting the visual representation to within the respective boundaries of the plurality of overlay elements.

6. The method of claim 1, further comprising:
receiving, by the computing device, a third indication of input to move to a return location within the GUI; and
responsive to receiving the third indication of input, disassociating, by the computing device, the data element with the respective spatial location corresponding to the chosen overlay element from the plurality of overlay elements.

7. The method of claim 1, wherein associating the data element with the respective spatial location corresponding to the chosen overlay element from the second plurality of overlay elements comprises creating a definition of a report specification, the method further comprising:
generating, by the computing device and based at least in part on the created definition, a report; and
outputting, by the computing device and for display, the report as part of the GUI.

8. The method of claim 1, wherein the first indication of input and the second indication of input each comprises an indication of touch input.

9. A computing device comprising:
at least one processor; and
at least one module operable by the at least one processor to:
output, for display, a graphical user interface (GUI) comprising one or more graphical objects representing one or more data elements from a data source;
receive a first indication of input to select a graphical object from the one or more graphical objects, the selected graphical object representing a data element from the one or more data elements, wherein the selection defines a start location within the GUI that is outside of an options area in the GUI;
receive an indication of a sliding input that moves the selected graphical object from the start location into a location within the options area in the GUI without outputting for display an overlay element that forms a path from the start location outside of the options area in the GUI to the location within the options area in the GUI;
determine, based at least in part on the data element, a set of spatial locations with which the data element can be associated, wherein each of the spatial locations comprises a location within a three-dimensional (3D) physical environment, and wherein the options area encompasses graphical representations of the set of spatial locations in the GUI;
responsive to the selected graphical object moving into the location within the options area in the GUI as a result of the sliding input, output, for display, a plurality of overlay elements and an additional graphical representation as part of the GUI, wherein the plurality of overlay elements comprises a set of two or more overlay elements and an additional overlay element, wherein each overlay element of the set of two or more overlay elements comprises a respective boundary that forms a respective path from the location within the options area to a respective graphical representation of a respective spatial location from the set of spatial locations, wherein the additional graphical representation represents a specialized option that corresponds to a grouping of two or more spatial locations from the set of spatial locations, wherein the additional graphical representation is distinct from the graphical representations of the set of spatial locations, wherein each spatial location of the grouping of two or more spatial locations is associated with a respective overlay element of the set of two or more elements, wherein the additional overlay element comprises a respective boundary that forms a respective path from the location within the options area to the additional graphical representation, and wherein the respective paths for each of the plurality of overlay elements correspond to Business Intelligence (BI) report options associated with the respective one or more spatial locations;
receive a second indication of input to traverse a chosen overlay element from the plurality of overlay elements, the traversal being from the start location and to a second location within the respective path of the chosen overlay element from the plurality of overlay elements;
responsive to receiving the second indication, associate the data element with the respective one or more spatial locations corresponding to the chosen overlay element from the plurality of overlay elements, and associating the data element associated with the respective one or more spatial locations with a respective BI report option associated with the respective one or more spatial locations in a BI report specification, thereby modifying the BI report specification based on the first indication of input and the second indication of input; and
generate an output for a BI report based on the BI report specification in which the data element with the respective BI report option is associated with the respective one or more spatial locations.

10. The computing device of claim 9, wherein the set of spatial locations with which the data element can be associated comprises a first set of spatial locations with which the data element can be associated, wherein the plurality of overlay elements comprises a first plurality of overlay elements, wherein associating the data element with the respective spatial location corresponding to the chosen overlay element from the first plurality of overlay elements comprises forming a spatially-associated data element, and wherein the at least one module is further operable by the at least one processor to:
responsive to receiving the second indication, determine, based at least in part on the spatially-associated data element, a second set of spatial locations with which the spatially-associated data element can be associated, each of the second set of spatial locations being defined at least partially located within the respective spatial location corresponding to the chosen overlay element from the first plurality of overlay elements;
output, for display, a second plurality of overlay elements as part of the GUI, each of the second plurality of overlay elements comprising a respective boundary that forms a respective path from the second location to a respective graphical representation of a respective spatial location from the second set of spatial locations;

receive a third indication of input to traverse a chosen overlay element from the second plurality of overlay elements, the traversal being from the second location and to a third location within the respective path of the chosen overlay element from the second plurality of overlay elements; and responsive to receiving the third indication, associate the data element with the respective spatial location corresponding to the chosen overlay element from the second plurality of overlay elements.

11. The computing device of claim 9, wherein the set of spatial locations comprises a set of geographical locations, and wherein the at least one module is further operable by the at least one processor to output, for display, a geographical map as part of the GUI, the geographical map including the respective graphical representation of geographical areas corresponding to each respective spatial location from the set of spatial locations, such that the selected graphical object representing the data element corresponds to a selected geographical area, and the data element associated with the respective spatial location is associated with a respective BI report option associated with the selected geographical area in a BI report specification.

12. The computing device of claim 11, wherein the at least one module is further operable by the at least one processor to, output, responsive to receiving the second indication of input and for display, a second geographical map as part of the GUI, the second geographical map including a respective graphical representation of each of a second set of spatial locations, each of the second set of spatial locations being contained within the respective spatial location corresponding to the chosen overlay element from plurality of overlay elements.

13. The computing device of claim 9, wherein the at least one module is further operable by the at least one processor to:
output, for display, a visual representation of the data element as part of the GUI; and
responsive to receiving the first indication of input, restrict the visual representation to within the respective boundaries of the plurality of overlay elements.

14. The computing device of claim 9, wherein the at least one module is further operable by the at least one processor to:
receive a third indication of input to move to a return location within the GUI; and
responsive to receiving the third indication of input, disassociate the data element with the respective spatial location corresponding to the chosen overlay element from the plurality of overlay elements.

15. The computing device of claim 9, wherein associating the data element with the respective spatial location corresponding to the chosen overlay element from the second plurality of overlay elements comprises creating a definition of a report specification, the at least one module further operable by the at least one processor to:
generate, based at least in part on the created definition, a report; and
output, for display, the report as part of the GUI.

16. The computing device of claim 9, wherein the first indication of input and the second indication of input each comprises an indication of touch input.

17. A computer program product comprising a computer readable storage medium having program code embodied therewith, the program code executable by at least one processor of a computing device to:

output, for display, a graphical user interface (GUI) comprising one or more graphical objects representing one or more data elements from a data source;
receive a first indication of input to select a graphical object from the one or more graphical objects, the selected graphical object representing a data element from the one or more data elements, wherein the selection defines a start location within the GUI that is outside of an options area in the GUI;
receive an indication of a sliding input that moves the selected graphical object from the start location into a location within the options area in the GUI without outputting for display an overlay element that forms a path from the start location outside of the options area in the GUI to the location within the options area in the GUI;
determine, based at least in part on the data element, a set of spatial locations with which the data element can be associated, wherein each of the spatial locations comprises a location within a three-dimensional (3D) physical environment, and wherein the options area encompasses graphical representations of the set of spatial locations in the GUI;
responsive to the selected graphical object moving into the location within the options area in the GUI as a result of the sliding input, output, for display, a plurality of overlay elements and an additional graphical representation as part of the GUI, wherein the plurality of overlay elements comprises a set of two or more overlay elements and an additional overlay element, wherein each overlay element of the set of two or more overlay elements comprises a respective boundary that forms a respective path from the location within the options area to a respective graphical representation of a respective spatial location from the set of spatial locations, wherein the additional graphical representation represents a specialized option that corresponds to a grouping of two or more spatial locations from the set of spatial locations, wherein the additional graphical representation is distinct from the graphical representations of the set of spatial locations, wherein each spatial location of the grouping of two or more spatial locations is associated with a respective overlay element of the set of two or more elements, wherein the additional overlay element comprises a respective boundary that forms a respective path from the location within the options area to the additional graphical representation, and wherein the respective paths for each of the plurality of overlay elements correspond to Business Intelligence (BI) report options associated with the respective one or more spatial locations;
receive a second indication of input to traverse a chosen overlay element from the plurality of overlay elements, the traversal being from the start location and to a second location within the respective path of the chosen overlay element from the plurality of overlay elements;
responsive to receiving the second indication, associate the data element with the respective one or more spatial locations corresponding to the chosen overlay element from the plurality of overlay elements, and associating the data element associated with the respective one or more spatial locations with a respective BI report option associated with the respective one or more spatial locations in a BI report specification, thereby modifying the BI report specification based on the first indication of input and the second indication of input; and generate an output for a BI report based on the BI report specification in which the data element with the respective BI report option is associated with the respective one or more spatial locations.

18. The computer program product of claim 17, wherein the set of spatial locations with which the data element can be associated comprises a first set of spatial locations with which the data element can be associated, wherein the plurality of overlay elements comprises a first plurality of overlay elements, wherein associating the data element with the respective spatial location corresponding to the chosen overlay element from the first plurality of overlay elements comprises forming a spatially-associated data element, and wherein the program code is further executable by the at least one processor of the computing device to:

responsive to receiving the second indication, determine, based at least in part on the spatially-associated data element, a second set of spatial locations with which the spatially-associated data element can be associated, each of the second set of spatial locations being defined at least partially located within the respective spatial location corresponding to the chosen overlay element from the first plurality of overlay elements;

output, for display, a second plurality of overlay elements as part of the GUI, each of the second plurality of overlay elements comprising a respective boundary that forms a respective path from the second location to a respective graphical representation of a respective spatial location from the second set of spatial locations;

receive a third indication of input to traverse a chosen overlay element from the second plurality of overlay elements, the traversal being from the second location and to a third location within the respective path of the chosen overlay element from the second plurality of overlay elements; and responsive to receiving the third indication, associate the data element with the respective spatial location corresponding to the chosen overlay element from the second plurality of overlay elements.

\* \* \* \* \*